US009858948B2

(12) United States Patent
Armstrong-Muntner et al.

(10) Patent No.: US 9,858,948 B2
(45) Date of Patent: Jan. 2, 2018

(54) ELECTRONIC EQUIPMENT WITH AMBIENT NOISE SENSING INPUT CIRCUITRY

(71) Applicant: Apple Inc., Cupertino, CA (US)

(72) Inventors: Joel S. Armstrong-Muntner, San Carlos, CA (US); Nicholas Paul Joseph Allec, Menlo Park, CA (US); Xiaoyi Mu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/197,506

(22) Filed: Jun. 29, 2016

(65) Prior Publication Data
US 2017/0090865 A1    Mar. 30, 2017

Related U.S. Application Data

(60) Provisional application No. 62/234,568, filed on Sep. 29, 2015.

(51) Int. Cl.
*G06F 3/16*        (2006.01)
*G10L 25/51*       (2013.01)
(Continued)

(52) U.S. Cl.
CPC .............. *G10L 25/51* (2013.01); *G06F 3/167* (2013.01); *H04R 3/005* (2013.01); *H04R 29/001* (2013.01); *H04R 2499/11* (2013.01)

(58) Field of Classification Search
CPC ......... G06F 3/167; G10L 25/51; H05R 3/005; H04R 29/001; H04R 2499/11
See application file for complete search history.

(56) References Cited

U.S. PATENT DOCUMENTS 4,081,631 A    3/1978  Feder
4,658,425 A    4/1987  Julstrom
(Continued)

FOREIGN PATENT DOCUMENTS

EP    2094032    8/2009
GB    2310559    8/1997
(Continued)

OTHER PUBLICATIONS

Baechtle et al., Adjustable Audio Indicator, IBM, 2 pages, Jul. 1, 1984.
(Continued)

*Primary Examiner* — Sonia Gay
(74) *Attorney, Agent, or Firm* — Treyz Law Group, P.C.; Zachary D. Hadd

(57) ABSTRACT

An electronic device may include one or more microphones that monitor ambient noise and generate ambient noise data. The electronic device may include processing circuitry that receives the ambient noise data and compares the ambient noise data to a baseline ambient noise profile to detect changes in the ambient noise. Changes in the ambient noise may be caused by user gestures. The electronic device may compare the changes in the ambient noise to characteristic changes in ambient noise that are associated with user gestures to determine the user gesture made by a user. The processing circuitry may modify the operation of the electronic device based on the user gesture. An ambient noise input device may include surface features or movable components that cause the characteristic changes in the ambient noise. Ambient noise input devices may provide feedback to guide a user to provide input using ambient noise sensing.

17 Claims, 18 Drawing Sheets

(51) Int. Cl.
*H04R 3/00* (2006.01)
*H04R 29/00* (2006.01)

(56) References Cited

U.S. PATENT DOCUMENTS

| | | | |
|---|---|---|---|
| 4,684,899 | A | 8/1987 | Carpentier |
| 5,060,206 | A | 10/1991 | DeMetz |
| 5,335,011 | A | 8/1994 | Addeo et al. |
| 5,570,324 | A | 10/1996 | Geil |
| 5,619,583 | A | 4/1997 | Page et al. |
| 5,691,697 | A | 11/1997 | Carvalho et al. |
| 6,073,033 | A | 6/2000 | Campo |
| 6,129,582 | A | 10/2000 | Wilhite et al. |
| 6,138,040 | A | 10/2000 | Nicholls et al. |
| 6,151,401 | A | 11/2000 | Annaratone |
| 6,154,551 | A | 11/2000 | Frenkel |
| 6,192,253 | B1 | 2/2001 | Charlier et al. |
| 6,246,761 | B1 | 6/2001 | Cuddy |
| 6,317,237 | B1 | 11/2001 | Nakao et al. |
| 6,813,218 | B1 | 11/2004 | Antonelli et al. |
| 6,829,018 | B2 | 12/2004 | Lin et al. |
| 6,882,335 | B2 | 4/2005 | Saarinen |
| 6,934,394 | B1 | 8/2005 | Anderson |
| 7,003,099 | B1 | 2/2006 | Zhang et al. |
| 7,054,450 | B2 | 5/2006 | McIntosh et al. |
| 7,082,322 | B2 | 7/2006 | Harano |
| 7,154,526 | B2 | 12/2006 | Foote et al. |
| 7,158,647 | B2 | 1/2007 | Azima et al. |
| 7,263,373 | B2 | 8/2007 | Mattisson |
| 7,266,189 | B1 | 9/2007 | Day |
| 7,346,315 | B2 | 3/2008 | Zurek et al. |
| 7,378,963 | B1 | 5/2008 | Begault et al. |
| 7,536,029 | B2 | 5/2009 | Choi et al. |
| 8,030,914 | B2 | 10/2011 | Alameh et al. |
| 8,300,845 | B2 | 10/2012 | Zurek et al. |
| 8,600,743 | B2 | 12/2013 | Lindahl et al. |
| 9,007,871 | B2 | 4/2015 | Armstrong-Muntner |
| 2004/0203520 | A1 | 10/2004 | Schirtzinger et al. |
| 2005/0271216 | A1 | 12/2005 | Lashkari |
| 2006/0072248 | A1 | 4/2006 | Watanabe et al. |
| 2008/0175408 | A1 | 7/2008 | Mukund et al. |
| 2008/0204379 | A1 | 8/2008 | Perez-Noguera |
| 2008/0292112 | A1 | 11/2008 | Valenzuela et al. |
| 2009/0157206 | A1* | 6/2009 | Weinberg ............... G06F 3/043 700/94 |
| 2009/0247237 | A1 | 10/2009 | Mittleman et al. |
| 2009/0274315 | A1 | 11/2009 | Carnes et al. |
| 2009/0316943 | A1 | 12/2009 | Munoz et al. |
| 2010/0080084 | A1 | 4/2010 | Chen et al. |
| 2010/0103776 | A1 | 4/2010 | Chan |
| 2011/0002487 | A1 | 1/2011 | Panther et al. |
| 2011/0161074 | A1 | 1/2011 | Pance et al. |
| 2011/0033064 | A1 | 2/2011 | Johnson et al. |
| 2011/0154233 | A1* | 6/2011 | Lamarca ............... G06F 3/0425 715/764 |
| 2011/0249824 | A1* | 10/2011 | Asada ................... G06F 1/1626 381/56 |
| 2011/0274303 | A1 | 11/2011 | Filson et al. |
| 2011/0310005 | A1* | 12/2011 | Chen ..................... G06F 1/3203 345/156 |
| 2012/0032905 | A1* | 2/2012 | Koshiyama ............ G06F 3/043 345/173 |
| 2012/0082317 | A1 | 4/2012 | Pance et al. |
| 2013/0057489 | A1 | 3/2013 | Morton et al. |
| 2015/0170672 | A1* | 6/2015 | Liu ........................ G10L 25/48 704/275 |
| 2015/0185963 | A1* | 7/2015 | Lee ....................... G06F 3/0433 345/177 |
| 2015/0193193 | A1 | 7/2015 | Khaira et al. |
| 2015/0199950 | A1 | 7/2015 | Heiman et al. |
| 2015/0205400 | A1* | 7/2015 | Hwang .................. G06F 3/044 345/654 |
| 2015/0277743 | A1* | 10/2015 | Isherwood ............ G06F 1/1626 715/863 |
| 2015/0289070 | A1 | 10/2015 | Armstrong-Muntner |
| 2015/0304785 | A1 | 10/2015 | Gan et al. |

FOREIGN PATENT DOCUMENTS

| | | |
|---|---|---|
| GB | 2342802 | 4/2000 |
| JP | 2102905 | 4/1990 |
| WO | 03049494 | 6/2003 |
| WO | 2004025938 | 3/2004 |
| WO | 2007083894 | 7/2007 |
| WO | 2008153639 | 12/2008 |
| WO | 2009017280 | 2/2009 |
| WO | 2011057346 | 5/2011 |

OTHER PUBLICATIONS

Pingali et al., "Audio-Visual Tracking for Natural Interactivity," Bell Laboratories, Lucent Technologies, pp. 373-382, Oct. 1999.
Jiang et al., "Seashell Effect Pretouch Sensing for Robotic Grasping" Robotics and Automation (ICRA), 2012 IEEE International Conference, May 2012, Saint Paul, MN, pp. 2851-2858, ISSN: 1050-4729, E-ISBN: 978-1-4673-1404-6, Print ISBN: 978-1-4373-1403-9, DOI:10.1109/ICRA.2012.6224985. Retrieved from the Internet <https://sensor.cs.washington.edu/pubs/pretouch_icra12.pdf>.
"A Beginner's Introduction to Microphone Polar Patterns" E-Home Recording Studio, Retrieved from the Internet <http://ehomerecordingstudio.com/microphone-polar-patterns/>.
Jiang, "Pretouch Sensing for Robotic Grasping", University of Washington, Oct. 20, 2014, 129 pages. Retrieved from the Internet: <https://scholar.google.com/citations?view_op=view_citation &hl=en&user=TuvLYDQAAAAJ&citation_for_view=TuvLYDQAAAAJ:ULOm3_A8WrAC>.
Bore et al. "Microphones Methods of Operation and Type Examples" Georg Neumann GmbH, 79 pages, Fourth Edition, 1999, Berlin, Germany, www.neumann.com.
Xie et al., "Single-Sensor Multispeaker Listening with Acoustic Metamaterials", Department of Electrical and Computer Engineering, Duke University, Durahm, NC, PNAS, 2015, 9 pages. Retrieved from the Internet <http://people.duke.edu/~yx35/reprints/Cocktail_party_listener PNAS2015.pdf>.
"Basis Sonar System (Active)" Federation of American Scoentist, SONAR Systems, ASW Systems, 13 pages. Retrieved from the Internet <http://fas.org/man/dod-101/navy/docs/es310/asw_sys/asw_sys.htm>.
"Acoustic Location" Wikipedia, the Free Encyclopedia, Wikipedia Contributors, Jun. 29, 2016, 7 pages Retrieved from the Internet <https://en.wikipedia.org/w/index.php?title=Acoustic_location &oldid=727569359>.

* cited by examiner

ELECTRONIC EQUIPMENT WITH AMBIENT NOISE SENSING INPUT CIRCUITRY

This application claims the benefit of provisional patent application No. 62/234,568, filed Sep. 29, 2015, which is hereby incorporated by reference herein in its entirety.

BACKGROUND

This relates to electronic devices and, more particularly, to electronic devices with input-output circuitry for receiving user input.

Electronic devices such as cellular telephones, computers, and other devices often include input-output components that allow a user to provide input to the electronic device. For example, electronic devices may include touch sensors or buttons that allow a user to provide commands to the electronic device.

Challenges can arise in providing input-output circuitry for an electronic device. If care is not taken, providing an electronic device with the ability to detect different types of user input may increase the size and complexity of the input-output circuitry and the electronic device.

SUMMARY

An electronic device may be provided with one or more microphones. The microphones may detect ambient noise that is produced by nearby people and objects. The microphones may generate a baseline auditory profile that is representative of the ambient noise.

The microphones may detect increases and decreases in volume, frequency, direction, and other characteristics of the ambient noise. Processing circuitry may process the changes and determine the cause of the changes. The electronic device may associate certain changes in the ambient noise with certain user input functions, and may cause a change in the operation of the electronic device based on the changes in the ambient noise.

The electronic device may detect a gesture made by a user based on changes in ambient noise. The device may determine characteristics of the gesture such as location, direction, proximity to the device, intensity, and which of a user's fingers or hands made the gesture. The electronic device may determine features of the gesture by comparing the changes in ambient noise to predetermined, characteristic ambient noise changes that are each associated with a particular gesture.

The microphones in the electronic device may be mounted in a device housing. The housing may include openings through which the ambient noise passes to reach the microphones. The openings may include resonant cavities that help to transmit the ambient noise to the microphones with emphasis on particular frequencies or bands of frequencies. The microphones may detect the presence of a user outside of the housing through the openings in the housing. The electronic device may include interior walls having acoustic steering elements that modulate sound waves that enter the housing.

The electronic device may be a wearable electronic device that detects changes in ambient noise through a user's fingers, hands, and arms. The electronic device may determine user gestures based on the changes. A first electronic device may generate ambient noise information in response to detected changes in ambient noise and transmit the signals to a second electronic device. The second electronic device may process the ambient noise information and modify the operation of the second electronic device based on the ambient noise information.

Multiple electronic devices may operate together in a system to detect changes in ambient noise. A system may include a first electronic device having a speaker that generates a tone that serves as a baseline ambient noise level and a second electronic device having a microphone that detects changes in the baseline ambient noise level generated by the first or second electronic device.

A system may include an ambient noise modulation device having surface features that cause characteristic changes in ambient noise as a user moves their hand relative to the device. The system may include an electronic device may have microphones that detect the characteristic changes in ambient noise and associate the changes with corresponding gestures made over the ambient noise modulation device. The ambient noise modulation device may itself detect the characteristic changes, and transmit the changes or commands based on the changes to the electronic device.

A system may include a stylus with a microphone that receives different ambient noise sound waves in response to pressure applied to a tip of the stylus. The stylus may communicate the changes in ambient noise to another electronic device that associates the changes with user inputs and takes corresponding action.

An electronic device that identifies user gestures using associated changes in ambient noise may provide a user with visual or other feedback indicative of whether or not the device is able to perform ambient noise sensing. The electronic device may have a light source that projects a visual outline onto a surface on which the device rests to indicate an area around the device in which user gestures produce detectable changes in ambient noise. A user may make numerous gestures during calibration operations so that the electronic device can identify an optimum area surrounding the device for ambient noise sensing. The optimum area can be identified by monitoring gestures performed by a user during a calibration process.

DETAILED DESCRIPTION

Electronic devices may be provided with audio transducers (e.g., microphones) that generate signals in response to sound waves and associated processing circuitry that analyzes the signals to determine deviations from a baseline level of noise in an environment in which the electronic device operates.

Figure 1:
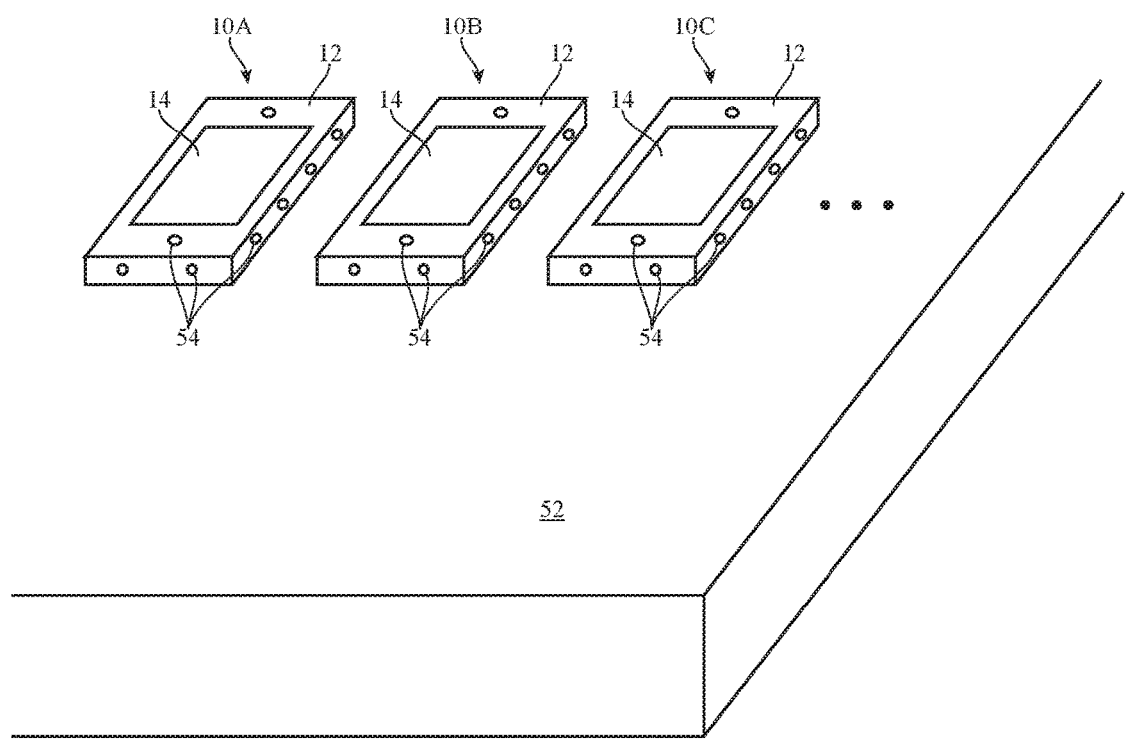
FIG. 1 is a perspective view of illustrative electronic devices that include microphones in accordance with an embodiment.

Illustrative electronic devices of the type that may use ambient noise processing to determine changes in ambient noise are shown in FIG. 1. As shown in FIG. 1, electronic device 10A, electronic device 10B, and electronic device 10C may each be provided with a plurality of microphones 54 (sometimes referred to herein as ambient noise sensors). Each electronic device 10 may be provided with one or more microphones 54 on one or more surfaces of the electronic device 10. In the illustrative example of FIG. 1, each electronic device 10 includes multiple microphones on two side surfaces of the electronic device and multiple microphones on a front surface of the electronic device. If desired, one or all of electronic devices 10A, 10B, and 10C may be provided with one or more microphones in these or other locations. For example, an illustrative electronic device of the type shown in FIG. 1 may have first and second opposing surfaces that form front and back surfaces of the electronic device. One or both of the first and second opposing surfaces may include one or more microphones mounted on or adjacent to the surface. If desired, an electronic device 10 may have one or more side surfaces and one or more microphones mounted on or adjacent to the side surfaces (e.g., microphones formed along a peripheral edge that wraps around the electronic device). One or more of electronic devices 10A, 10B, and 10C may include multiple microphones arranged in an array on or beneath an exterior surface of the electronic device. As shown in the illustrative example of FIG. 1, each electronic device may include a housing 12 in and/or on which microphones 54 and other device components are mounted, as well as a display 14 for displaying content to a user.

As shown in the illustrative example of FIG. 1, electronic devices 10A, 10B, and 10C may be placed on a surface 52 such as a table or countertop. Electronic device 10 may operate in an environment in which ambient noise is present in the form of sound waves, noises, and other auditory signals The ambient noise may originate from the day-to-day movement and functions of people, machines, and other objects. For example, the rustling of papers and a running fan may create a baseline level of ambient noise in an office. The sounds of nearby traffic and people walking along a sidewalk may produce background noise on a city street. The chirping of birds and the movement of leaves in the wind, an air-conditioner hiss, refrigerator hum, near or distant voices, dogs barking, rustling of leaves or clothing, footsteps, passing cars, trucks, airplanes, jets, sounds transmitted through an open window or through the walls, the clatter of dishes or glasses in a restaurant or bar, music playing next door or in the next room, and in a seemingly silent environment, even a user's own breathing may provide sufficient ambient noise sources to enable ambient noise sensing.

may contribute to ambient noise in a park. These examples, however, are merely illustrative. Ambient noise may originate from a variety of different sources depending on the surrounding environment in which an electronic device is operating.

As the environment around the electronic device 10 changes (e.g., a user moves closer to or farther away from the device, a user or other object contacts surface 52, an object blocks some or all of the microphones on one or more surfaces of the device, etc.), the ambient noise that reaches the electronic device 10 may also change. The electronic device may be able to detect these changes in ambient noise using microphones and process data from the microphones using ambient noise processing circuitry to determine the nature of the changes.

Figure 2A:
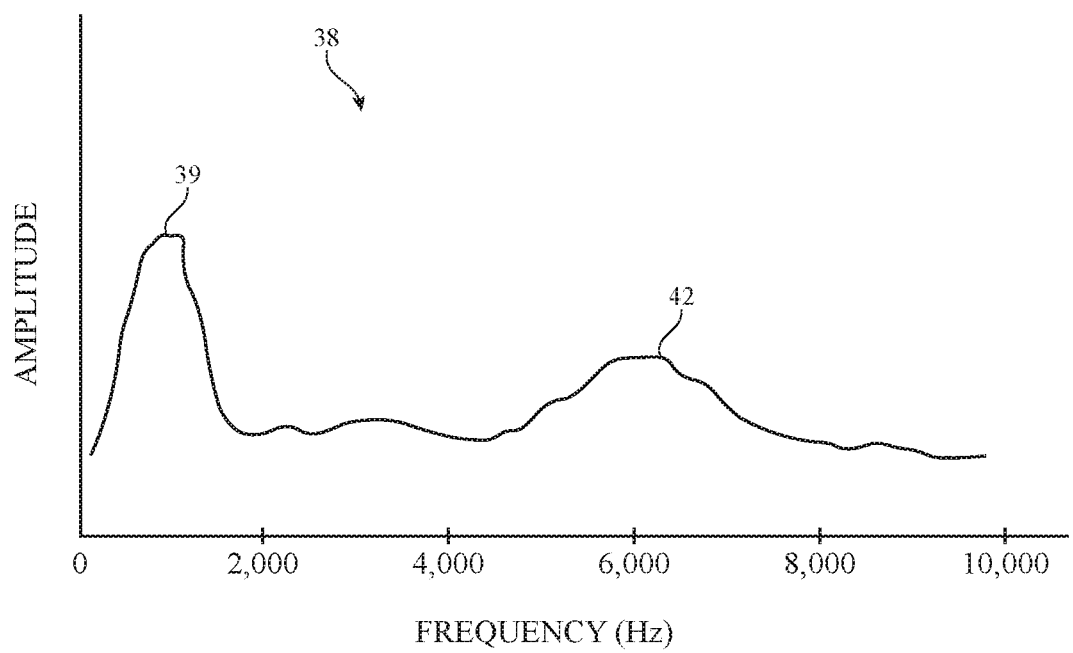
FIG. 2A is a diagram of an illustrative ambient noise profile in accordance with an embodiment.

FIG. 2A is an illustrative profile of a baseline ambient noise level. As shown in FIG. 2A, the ambient noise may include sounds at a range of frequencies. For example, a baseline ambient noise profile 38 such as that shown in FIG. 2A may represent average ambient noise levels for frequencies ranging from 0 hertz (Hz) to 10,000 Hz. Such a baseline ambient noise profile may include a low-frequency peak 39 at approximately 1,000 Hz (as an example) and a peak 42 at approximately 6,000 Hz. Peaks 39 and 42 are, however, merely illustrative. Depending on the environment surrounding the electronic device (e.g., objects that may block or redirect the ambient noise) and the source of the sounds that contribute to the ambient noise profile, the baseline ambient noise level 38 may include peaks or troughs having numerous amplitudes at a variety of different frequencies.

If desired, baseline ambient noise 38 may be determined using one or more microphones 54 in an electronic device 10. For example, a microphone 54 may be powered on and generating microphone signals (sometimes referred to herein as ambient noise signals, ambient noise data, or ambient noise measurements) in response to the ambient noise while the electronic device is otherwise idle (e.g., in a standby mode). Processing circuitry may receive and process the microphone signals to generate an ambient noise profile such as that shown in FIG. 2A. If desired, the ambient noise profile may represent the average contributions of various frequencies of sound to the overall ambient noise level over a given period of time. This, however, is merely illustrative. If desired, a baseline ambient noise profile 38 such as that shown in FIG. 2A may be pre-loaded onto an electronic device 10, loaded onto electronic device 10 as a software or hardware component, or otherwise obtained in electronic device 10 without the use of microphones 54.

Predetermined ambient noise level 38 may serve as a baseline ambient noise level that is used to determine changes in the ambient noise in a given environment. For example, a microphone 54 may measure ambient noise levels, and generate ambient noise data (sometimes referred to herein as ambient noise information, ambient noise measurements, ambient noise readings, etc.) based on the measured ambient noise. The measured ambient noise levels may include deviations from an average ambient noise profile, such as that shown in FIG. 2A. Processing circuitry in the electronic device 10 may compare the ambient noise data to the baseline ambient noise information to determine changes in the ambient noise. The processing circuitry may determine characteristics of the changes in the ambient noise (e.g., the frequency, amplitude, and duration of the change) based on the comparisons, and determine the nature of the change. For example, the processing circuitry may determine that the change was caused by a user of the electronic device (e.g., a user gesture, a user input, a user input command, a user input gesture, etc.), and may determine the relative location of the user, the gesture that the user made to cause the change, and the intensity, duration, and direction of the gesture based on the characteristics of the change in the ambient noise.

Figure 2B:
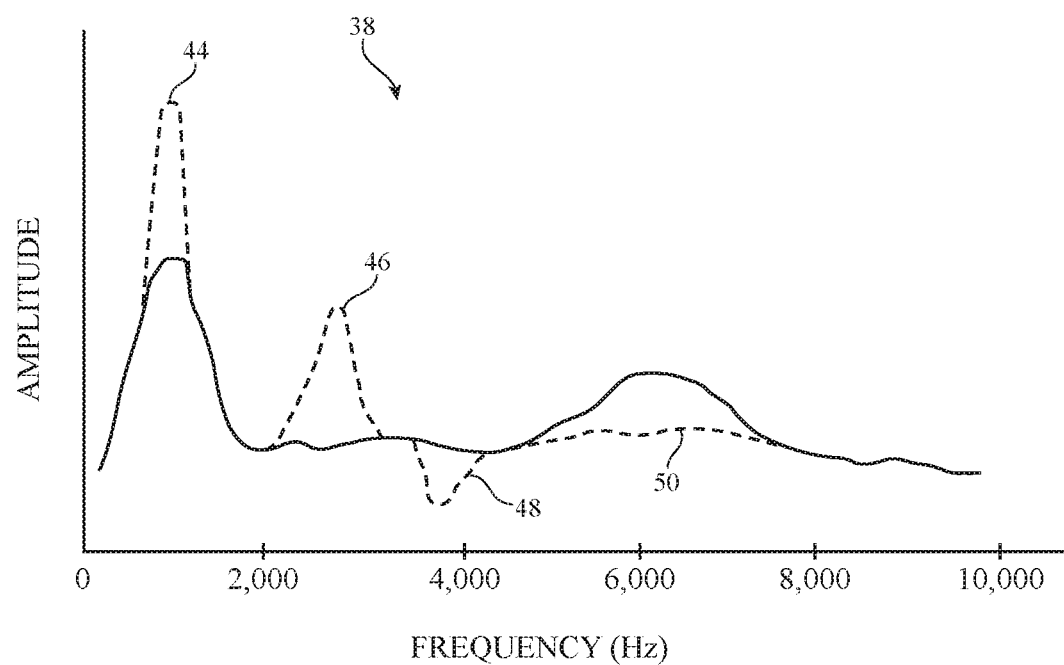
FIG. 2B is a diagram of an illustrative ambient noise profile and illustrative changes in the ambient noise profile in accordance with an embodiment.

FIG. 2B is an illustrative diagram of ambient noise levels in an environment and characteristic changes in the ambient noise that may occur. For example, a baseline level 38 of ambient noise that is measured by an electronic device 10 may demonstrate a peak 44 at low frequencies in response to changes in the environment surrounding electronic device 10. For example, if an object is moved into close proximity to device 10, there may be an increased low-frequency peak 44 (e.g., a higher amplitude peak) at around 1000 Hz (as an example). Low-frequency peak 44 may result from an object that is in close proximity to electronic device 10 (e.g., a user) forming resonant cavities that amplify certain frequencies that are present in the ambient noise. As shown in FIG. 2B, baseline ambient noise level 38 may also demonstrate decreases in the amplitude of high-frequency components of the ambient noise, as shown by reduced amplitude 50 at approximately 6,000 Hz. An object in close proximity to electronic device 10 may serve as a bandwidth filter and limit the frequencies in the ambient noise that are received at a microphone 54.

In some suitable scenarios, certain frequencies in the ambient noise may be amplified (as shown by peak 44) and other frequencies in the ambient noise may be limited (as shown by damping 50) in response to the same environmental change (e.g., a user in close proximity to the electronic device 10). This, however, is merely illustrative. The ambient noise 38 that is received may change in other ways independent of or in combination with the low frequency peaking and high frequency damping described above. For example, peaks 46 and trough 48 in ambient noise level 38 may result from various changes in the area surrounding electronic device 10 while electronic device 10 is sampling ambient noise. For example, a user may move a hand over one or more microphones 54 in the electronic device, creating resonant cavities that cause spikes about certain frequencies, while possibly muffling other frequencies. In one suitable example, a user may move a hand or finger closer to or farther away from one or more microphones 54, inducing changes in the ambient noise profile by blocking ambient noise from certain sources while increasing the relative contribution of noise from other sources. In some scenarios, a user may change the ambient noise profile 38 by producing sounds that constructively or destructively interfere with frequencies that are present in the baseline ambient noise level.

Certain environmental changes such as those described above may be associated with characteristic changes in the ambient noise profile 38. For example, spikes, peaks, muffling, and damping at various frequencies may be characteristic changes in ambient noise that are associated with respective changes (e.g., user gestures, user movement, and user input) in the area surrounding electronic device 10. Processing circuitry in the electronic device can determine that a change has occurred by detecting associated characteristic changes in the ambient noise. In this way, ambient noise sensing and processing may be used to detect user gestures and other actions in the vicinity of an electronic device.

Figure 3:
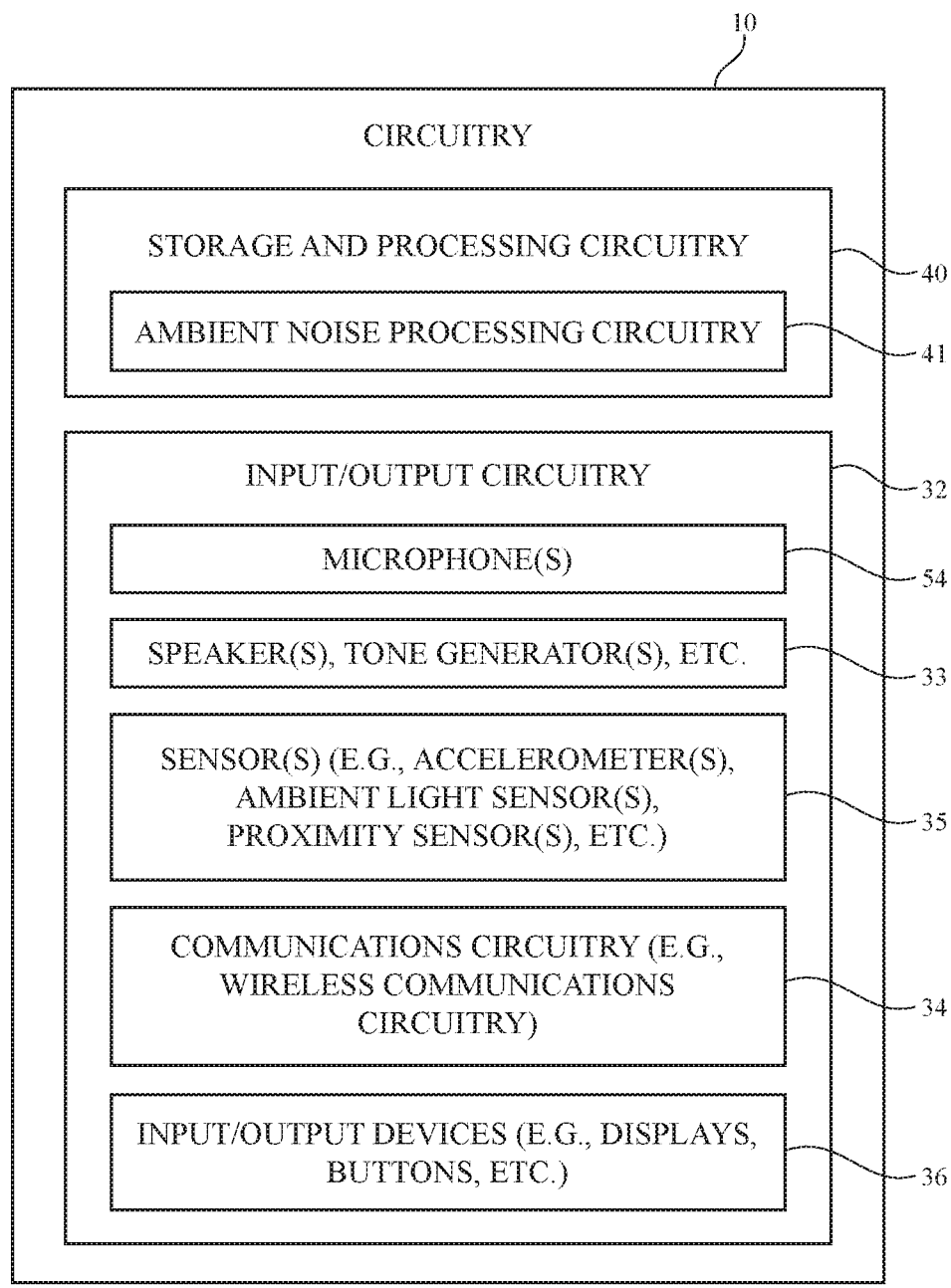
FIG. 3 is a schematic diagram of illustrative circuitry for use in an electronic device in accordance with an embodiment.

A schematic diagram of an illustrative circuitry 10 that may form part or all of an electronic device is shown in FIG. 3. As shown in FIG. 3, circuitry 10 (sometimes referred to herein as electronic device 10) may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on one or more microprocessors, microcontrollers, digital signal processors, baseband processor integrated circuits, application specific integrated circuits, etc.

To support interactions with external equipment, storage and processing circuitry 40 may be used in implementing communications protocols. Communications protocols that may be implemented using storage and processing circuitry 40 include internet protocols, wireless local area network protocols (e.g., IEEE 802.11 protocols—sometimes referred to as WiFi®), protocols for other short-range wireless communications links such as the Bluetooth® protocol, etc.

If desired, storage and processing circuitry 40 may include ambient noise processing circuitry 41. Ambient noise processing circuitry 41 may include a specialized integrated circuit such as an ambient noise processing integrated circuit that receives ambient noise signals from microphones 54 in device 10. By providing electronic device 10 with ambient noise processing circuitry 41, ambient noise processing operations may be carried out even when other components of processing circuitry 40 (e.g., a CPU or other processors) are inactive. In one suitable example, the processing and power requirements associated with ambient noise processing may be partially or completely offloaded from other processing components onto ambient noise processing circuitry 41, thereby allowing ambient noise processing to run in the background even when other functions of device 10 are inactive. If desired, device 10 may be operable in a low power mode in which some or all of storage and processing circuitry 40 is inactive (e.g., powered down) while ambient noise processing circuitry 41 is actively processing ambient noise signals to determine when the low power mode should be deactivated and some or all of the functions of storage and processing circuitry 40 should be restored.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as buttons, joysticks, click wheels, scrolling wheels, a touch screen (e.g., a display 14 as described in connection with FIG. 1 may be a touch screen display), other touch sensors such as track pads or touch-sensor-based buttons, vibrators, image capture devices such as a camera module having an image sensor and a corresponding lens system, keyboards, status-indicator lights, key pads, speakers, and other equipment for gathering input from a user or other external source and/or generating output for a user or for external equipment. Output components in device 10 may produce an output (e.g., display content that is displayed on a display screen, sound that is produced by a speaker, haptic feedback that is produced by a vibrator, etc.) for a user of device 10.

Sensor circuitry such as sensors 35 of FIG. 3 may include an ambient light sensor for gathering information on ambient light, proximity sensor components (e.g., light-based proximity sensors and/or proximity sensors based on other structures), accelerometers, gyroscopes, magnetic sensors, and other sensor structures. Sensors 35 of FIG. 3 may, for example, include one or more microelectromechanical systems (MEMS) sensors (e.g., accelerometers, gyroscopes, microphones, force sensors, pressure sensors, capacitive sensors, or any other suitable type of sensor formed using a microelectromechanical systems device).

Input-output circuitry 32 of FIG. 3 may include one or more microphones 54. As described in connection with FIG. 1, one or more microphones (audio transducers) 54 may convert sound waves into electrical signals that are transmitted to storage and processing circuitry 40 (e.g., ambient noise processing circuitry 41) for processing. If desired, device 10 may include a plurality of microphones 54 formed in an array or other suitable configuration or pattern that each receive different baseline ambient noise levels and different changes in the ambient noise levels in response to changes in the environment.

Input-output circuitry 32 of FIG. 3 may include one or more audio output components 33 (e.g., speakers, tone generators, ultrasonic frequency generators, etc.) that generate sound waves. In one suitable arrangement, audio output components 33 may generate sound waves that make up some or all of the ambient noise baseline 38 detected by microphones 54. The sounds generated by audio components 33 may be audible (e.g., within the range of human hearing), ultrasonic, or a combination of both, if desired. Audio components 33 may be able to produce a more consistent and predictable baseline against which changes can be measured, which may simplify determination of characteristic changes associated with certain environmental conditions (e.g., user gestures). If desired, a first electronic device 10 (e.g., electronic device 10A as shown and described in connection with FIG. 1) may generate a baseline audio profile using audio output components 33, while a second electronic device 10 (e.g., electronic device 10B as shown and described in connection with FIG. 1) may detect the baseline audio profile and changes in the baseline audio profile due to user gestures or other environmental conditions. This, however is merely illustrative. If desired, the baseline audio profile against which changes in ambient noise are measured may not include any auditory signals generated by audio output components 33 in electronic device 10.

If desired, one of more electronic devices 10 (e.g., electronic devices 10A, 10B, and 10C described in connection with FIG. 1) may include none, some, or all of the components described above in connection with an illustrative electronic device 10. In at least one suitable example, multiple electronic devices 10 having similar or different components may be used together in ambient noise detection and processing operations.

If desired, an electronic device 10 (e.g., one or more of electronic devices 10A, 10B, and 10C) may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

If desired, electronic devices 10 may include a housing 12 in which one or more microphones 54 and associated processing circuitry are mounted. If desired, the housing 12 may include upper and lower portions that are coupled with a hinge that allows the upper portion to rotate relative to the lower portion. The housing 12 may be machined or molded as a single structure (e.g., a unibody housing). An electronic device 10 may include a display 14 mounted in the housing 12. The display 14 may form parts of the front, rear, and side surface of the electronic device 10. The display 14 may be substantially filled with active display pixels or may have an active portion and an inactive portion. The display 14 may have openings (e.g., openings in the inactive or active portions of display) such as an opening to accommodate buttons and an opening to accommodate speakers.

Electronic devices 10A, 10B, and 10C may each be similar electronic devices (e.g., cellular telephones) or may each be different (e.g., a cellular telephone, a laptop computer, and a wearable electronic device, for example). If desired, any one or all of electronic devices 10A, 10B, and 10C may include some or all of the electronic device components described above. Although FIG. 1 shows three electronic devices 10A, 10B, and 10C, this is merely illustrative. In general, one, two, three, or more than three electronic devices may be used alone or together for ambient noise detection and processing.

Figure 4:
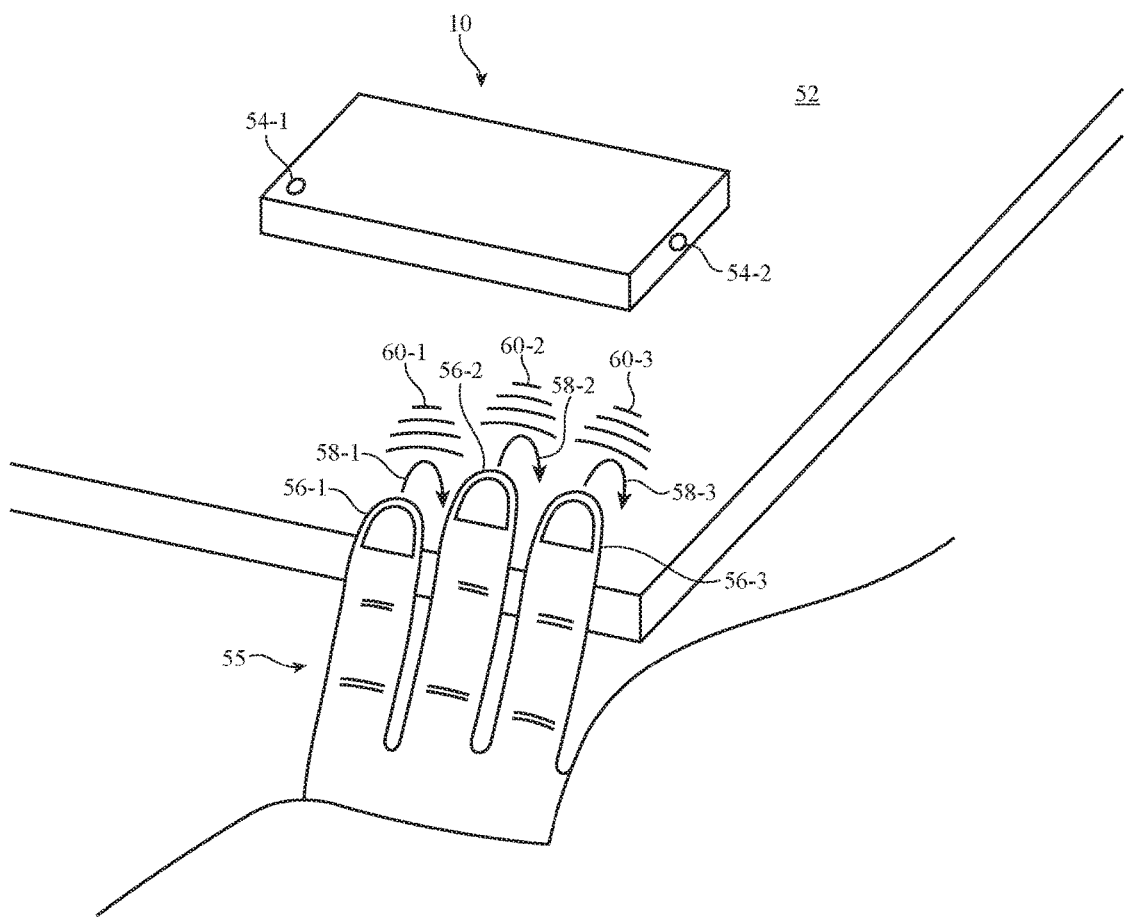
FIG. 4 is a perspective view of an illustrative electronic device in an environment that includes a user and changes in the ambient noise in the environment in accordance with an embodiment.

An illustrative example of an electronic device that may use ambient noise sensing and processing is shown in FIG. 4. In the illustrative example of FIG. 4, an electronic device 10 having a first microphone 54-1 and a second microphone 54-2 is provided on a surface 52 with a user 55 nearby. In the example of FIG. 4, microphones 54-1 and 54-2 may be actively receiving sound waves that make up the ambient noise profile around the electronic device 10, and may be generating ambient noise data based on the ambient noise. User 55 may be present near surface 52 and device 10. For example, a user may be holding their hand above surface 52. Electronic device 10 may sense that a user has placed their hand in proximity to the surface 52 and device 10 based on a change in ambient noise caused by the user's hand, and re-adjust the baseline ambient noise profile based on this change (after one, three, five, ten, less than then, or more than 10 seconds, for example). Alternatively, processing circuitry in the electronic device may be configured to detect that a user has simply moved their hand near the device 10, and disregard any associated change in ambient noise as not being associated with a user gesture.

A user may make gestures that change the ambient noise in the environment surrounding device 10. For example, a user may move finger 56-1 downwards onto surface 52 as shown by arrow 58-1, causing a change 60-1 in the ambient noise. In one suitable scenario, a user may simply place their finger on the table (e.g., without creating any audible sound). In such a scenario, the placement of a user's finger 56-1 on the surface 52 may cause a change in the ambient noise that is received at one or both of microphones 54-1 and 54-2. For example, the placement of finger 56-1 on surface 52 may block some of the ambient noise from reaching microphones 54-1 and 54-2, resulting in peaks or muffling at certain frequencies in the ambient noise profile. Microphones 54-1 and 54-2 may detect such changes in the ambient noise profile and, in response to the changes, generate different ambient noise data than that which is generated in accordance with the baseline ambient noise profile. The changes in the ambient noise data may be processed by processing circuitry in the electronic device 10 to determine the change in the ambient noise. By comparing the change in the ambient noise to known characteristic changes in the ambient noise that are associated with known user gestures, the electronic device 10 may be able to determine that the change in ambient noise was caused by finger 56-1, rather than finger 56-2 or finger 56-3.

The illustrative example described above in which finger 56-1 causes the change in the ambient noise is, however, merely illustrative. As shown in FIG. 4, for example, a user 55 may move finger 56-2 downward onto surface 52 (in a tapping motion, for example), as shown by arrow 58-2. This downward movement may cause a change 60-2 in the ambient noise, which may be measured by microphones 54-1 and 54-2. The change in ambient noise data caused by the change 60-2 in the ambient noise data may be processed by processing circuitry in electronic device 10 such that the gesture made by user 55 (e.g., placing finger 56-2 on the surface 52) may be differentiated from other user gestures (e.g., gestures involving fingers 56-1 or 56-2). Similarly, the placement of finger 56-3 on surface 52 as shown by arrow 58-3 may cause a change 60-3 in the ambient noise that is detected and processed by microphones 54-1 and 54-2 to determine that the change was caused by finger 56-3 moving towards surface 52, rather than another gesture made by another finger. In general, each of changes 60-1, 60-2, and 60-3 may be different such that electronic device can differentiate between the different changes and the gestures associated with each respective change.

The examples described above in which the changes 60-1, 60-2, and 60-3 are caused simply by a user placing a finger on a table are merely illustrative. If desired, a user 55 may move a finger (such as finger 56-1, for example) downward in direction 58-1 and contact surface 52 with enough force to cause an increased change 60-1 in the ambient noise profile. In this way, electronic device 10 may be able to detect the force or magnitude associated with gestures made by a user. In one example, the tapping of a user's finger 56-1 on the table may generate additional sounds that increase certain frequencies in the ambient noise profile or that add new frequencies to the ambient noise profile, thereby generating a different change 60 in the ambient noise detected by the microphones 54.

In another suitable example, a user may move a finger 56 in one of directions 58 without actually contacting surface 52, while still generating a change 60 in the ambient noise. This change in ambient noise may be detected by microphones 54 and processed by electronic device 10 to determine the gesture associated with the change, which of the user's fingers 56 made the gesture, the intensity of the gesture, the direction from which the change occurred, and other characteristics of the change.

As shown in the example of FIG. 4, electronic device 10 may include a first microphone 54-1 and a second microphone 54-2. Microphones 54-1 and 54-2 may be formed in different locations and on different surfaces of electronic device 10, as shown in FIG. 4. This, however, is merely illustrative. If desired, one or more microphones 54 may be formed on the same surface of electronic device 10 (e.g., two or more microphones formed in an array), or may be formed on adjacent portions of different surfaces of electronic device 10. By forming microphones 54-1 and 54-2 in different locations, each microphone may detect different changes in the ambient noise, even if the change is caused by the same event or user gesture.

In one example, microphone 54-1 may generate a first set of ambient noise data, and microphone 54-2 (e.g., an additional microphone) may generate a second set of ambient noise data (e.g., additional ambient noise data). The first and second sets of ambient noise data may reflect different changes in ambient noise detected by each of the microphones. By comparing the first and second sets of ambient noise data, characteristics of the change in ambient noise may be determined. For example, both first and second microphones 54-1 and 54-2 may detect a spike in the ambient noise at a given frequency. The intensity of the spike detected by microphone 54-1 may be greater than that detected by microphone 54-2, indicating that the event that caused the spike (e.g., a user gesture), occurred closer to microphone 54-1 than microphone 54-2. In another example, microphone 54-2 may detect a change in ambient noise, while microphone 54-1 may not experience any change in the ambient noise. Based on comparisons between the two ambient noise signals, the electronic device may be able to determine that the event that caused the change involved an obstruction of the ambient noise in the plane of the second microphone, but no obstruction of the ambient noise in the plane of the first microphone. In this way, the different changes in ambient noise detected by different microphones on or in the electronic device may be used to determine characteristics such as location, duration, and intensity of the user gesture or other event that caused the change.

If desired, microphone 54-1 may measure a first ambient noise level that is used to generate a first baseline ambient noise profile, and microphone 54-2 may measure a second ambient noise level that is used to generate a second baseline ambient noise profile. In this way, each of microphones 54-1 and 54-2 may generate a baseline that accounts for the differences in ambient noise that each microphone may experience based on the different locations or orientations of the microphones. This, however, is merely illustrative. If desired, the baseline ambient noise readings from each of microphones 54-1 and 54-2 may be averaged to generate a single ambient noise profile against which readings from microphone 54-1 and 54-2 are compared to determine changes in the ambient noise.

Microphones 54-1 and 54-2 may also detect other user gestures associated with ambient noise signatures. For example, microphones may be able to detect proximity-based user gestures, such as a user moving their hand above the electronic device (e.g., closer to or farther away), moving their hand over the electronic device (e.g., swiping), or towards and away from an edge of the electronic device (e.g., a U-shaped gesture). Microphones 54 may detect these user gestures based on their ambient noise signatures and respond accordingly. Examples of responses that the electronic device may perform include swiping through (switching between) different display screens, zooming in and out of display screens, adjusting the volume of a speaker or brightness of a display, or performing application-specific functions, such as controls within a gaming application.

Figure 5:
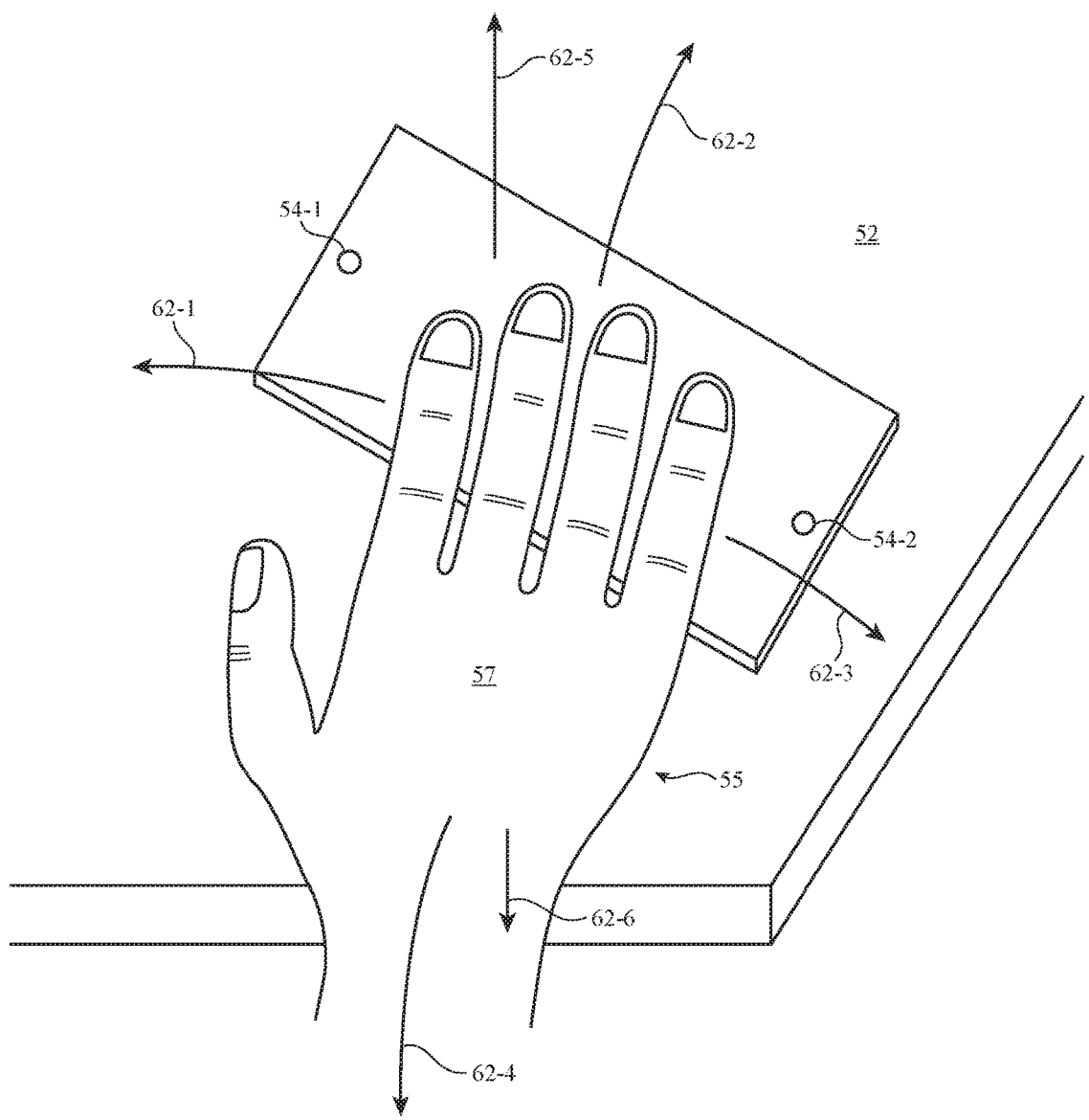
FIG. 5 is a perspective view of an illustrative electronic device in an environment that includes a user and changes in the ambient noise in the environment in accordance with an embodiment.

An illustrative example of an electronic device that may use ambient noise sensing and processing to determine changes in ambient noise is shown in FIG. 5. As shown in FIG. 5, electronic device 10 may operate in an environment that includes a surface 52 on which the electronic device 10 rests and a user 55 having a hand 57. In the illustrative example of FIG. 5, a user 55 may move their hand 57 in one or more directions. For example, a user may move their hand to the left (as shown by arrow 62-1), forward (as shown by arrow 62-2), to the right (as shown by arrow 62-3) and back (as shown by arrow 62-4). If desired, each of movements 64-1 to 64-4 may occur in a plane that is substantially parallel to surface 52. A user may also move their hand in directions that are substantially transverse to the plane of surface 52, such as upward (as shown by arrow 62-5), and downward (as shown by arrow 62-6). In one suitable example, a user may make the above-mentioned movements without touching or otherwise physically contacting surface 52 or device 10.

As a user moves their hand in directions 64-1 to 64-6 described above, the ambient noise received at microphones 54-1 and 54-2 on device 10 may change. For example, as a user moves their hand from a position over device 10 in a direction downward and closer to the device 10 (as shown by arrow 62-6), the ambient noise received at microphones 54-1 and 54-2 may include a spike at low frequencies and damping at higher frequencies as the higher frequencies are filtered out and the lower frequencies are amplified due to the resonant cavity formed by the proximity of the user's hand to the device 10 and surface 52. Based on these characteristic changes in the ambient noise, electronic device 10 may determine that a user's hand has been moved closer to the electronic device and respond accordingly.

In another suitable example, microphones 54-1 and 54-2 may detect similar changes in ambient noise, but at different times. For example, if a user 55 moves hand 57 in direction 62-3, microphone 54-1 may detect a characteristic change in the ambient noise that indicates that hand 57 passed over microphone 54-1 at a first time, while microphone 54-2 may detect a characteristic change in the ambient noise that indicates that hand 57 passed over microphone 54-2 at a second time that is temporally after the first time. By comparing the temporal differences in the ambient noise changes, processing circuitry in the electronic device may be able to determine that a user performed a left-to-right swiping gesture over the electronic device 10.

In another suitable example, microphones 54-1 and 54-2 may experience a similar change in ambient noise at approximately the same time. For example, both microphone 54-1 and microphone 54-2 may experience a similar change in ambient noise for a similar duration of time between otherwise normal ambient noise readings. Such a change may indicate, for example, that a user 55 moved hand 57 over device 10 in direction 62-2, causing similar changes in ambient noise at microphones 54-1 and 54-2 at approximately the same time. In this way, electronic device 10 may be able to determine that a user performed a back-to-front swiping gesture over device 10.

If desired, similarities and differences between the ambient noise readings generated by microphones 54-1 and 54-2 may be used to determine other gestures, such as diagonal gestures and gestures with multiple directional components. For example, differences in the magnitude, frequency, duration, and relative timing of the changes in ambient noise detected by microphones 54-1 and 54-2 may be compared to known characteristic changes in ambient noise associated with different known user gestures to determine the gesture that was made by the user.

Electronic device 10 may modify the operation of one or more device components in response to ambient noise information from one or microphones 54. For example, processing circuitry in the electronic device may change an operational parameter of the electronic device such as changing a brightness level, changing a volume level, locking or unlocking the device, or another suitable response. If desired, the processing circuitry may adjust an output of an output component of the electronic device (e.g., a display, a speaker, a haptic feedback component, etc.) in response to a user movement (e.g., a user gesture or a user input command) by changing the content displayed on the display or changing the sound produced by the speaker. In one suitable example, the display may present display content (e.g., a graphical user interface) that includes a cursor or other symbol that a user may use to select and control components of the graphical user interface. The processing circuitry may change the location of the cursor on the display or select a portion of the graphical user interface (in accordance with a clicking operation, for example) in response to changes in the ambient noise caused by the user input. If desired, a user dragging, sliding, or otherwise moving one or more fingers across a surface may correspond to a change in the ambient noise that that is recognized by the device and causes the device to move a cursor across the screen. A user tapping or otherwise placing one or more fingers on a surface may cause a change in the ambient noise that causes the processing circuitry to select a component of a graphical user interface (in accordance with a clicking operation, for example). The processing circuitry may cause the electronic device to scroll up or down through content that is displayed on the display in response to changes in the ambient noise caused by a user dragging or swiping one or more fingers across a surface. In one suitable arrangement, the processing circuitry may increase or decrease the volume of music or another speaker output in response to ambient noise changes caused by a user moving their hand closer to or farther from the electronic device. If desired, processing circuitry in electronic device 10 may cause an audio playback operation to move forward or backwards (e.g., fast-forward or rewind) in response to a user swiping their hand over the electronic device. Processing circuitry may adjust a volume level for a speaker or brightness level for a display in response to a user moving their hand up and down over the electronic device. Processing circuitry may interpret an ambient noise-based user input as denoting a change in the outward-inward position of a user relative to (i.e., nearer to or farther from) the electronic device along a depth dimension (i.e., along a z axis perpendicular to x and y axes that are parallel to a plane defined by a surface of the device). In the context of a game or photo-viewing application, for example, movement of a user's hand may represent travel forward or back in time. These examples, however, are merely illustrative. An electronic device 10 having a microphone 54 and processing circuitry may associate numerous changes in ambient noise with various user gestures and make one or more suitable changes to device operation in response to the user gestures.

Figure 6:
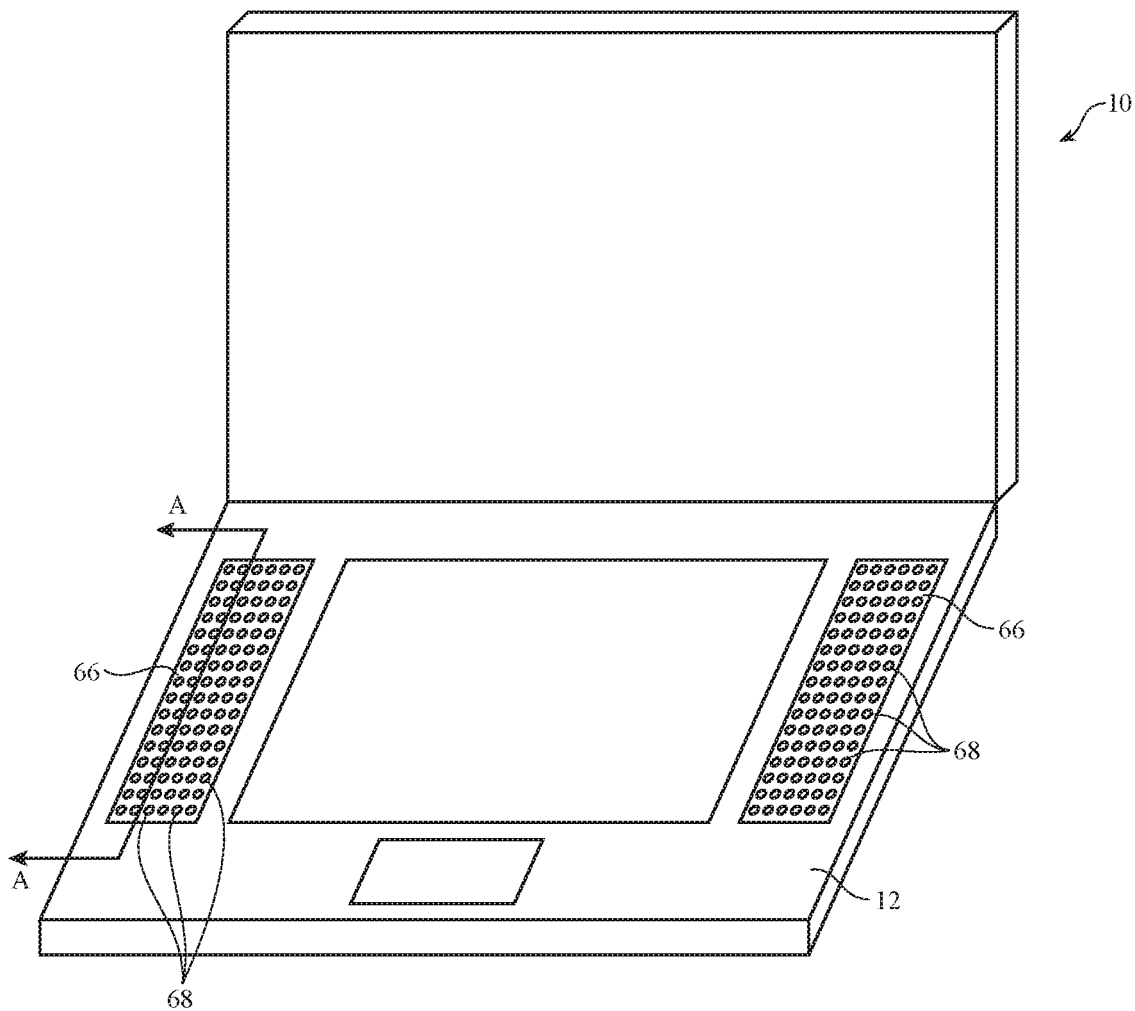
FIG. 6 is a perspective view of an illustrative electronic device having a housing and openings in a surface of the housing in accordance with an embodiment.

An illustrative electronic device 10 having a housing 12 that includes openings 68 is shown in FIG. 6. As shown in FIG. 6, openings 68 may form part of a speaker grille 66 under which one or more microphones and/or one or more speakers may be mounted. This, however, is merely illustrative. If desired, openings 68 may be discrete openings formed in housing 12 in electronic device 10 that are used only for directing sound to microphones mounted in the housing near the openings. In the illustrative example of FIG. 6, electronic device 10 is shown as a laptop computer having upper and lower housing portions, with the openings 68 formed as part of the lower housing portion. This arrangement is merely illustrative. If desired, openings 68 may be formed in any desired portion of a device housing 12.

Figure 7A:
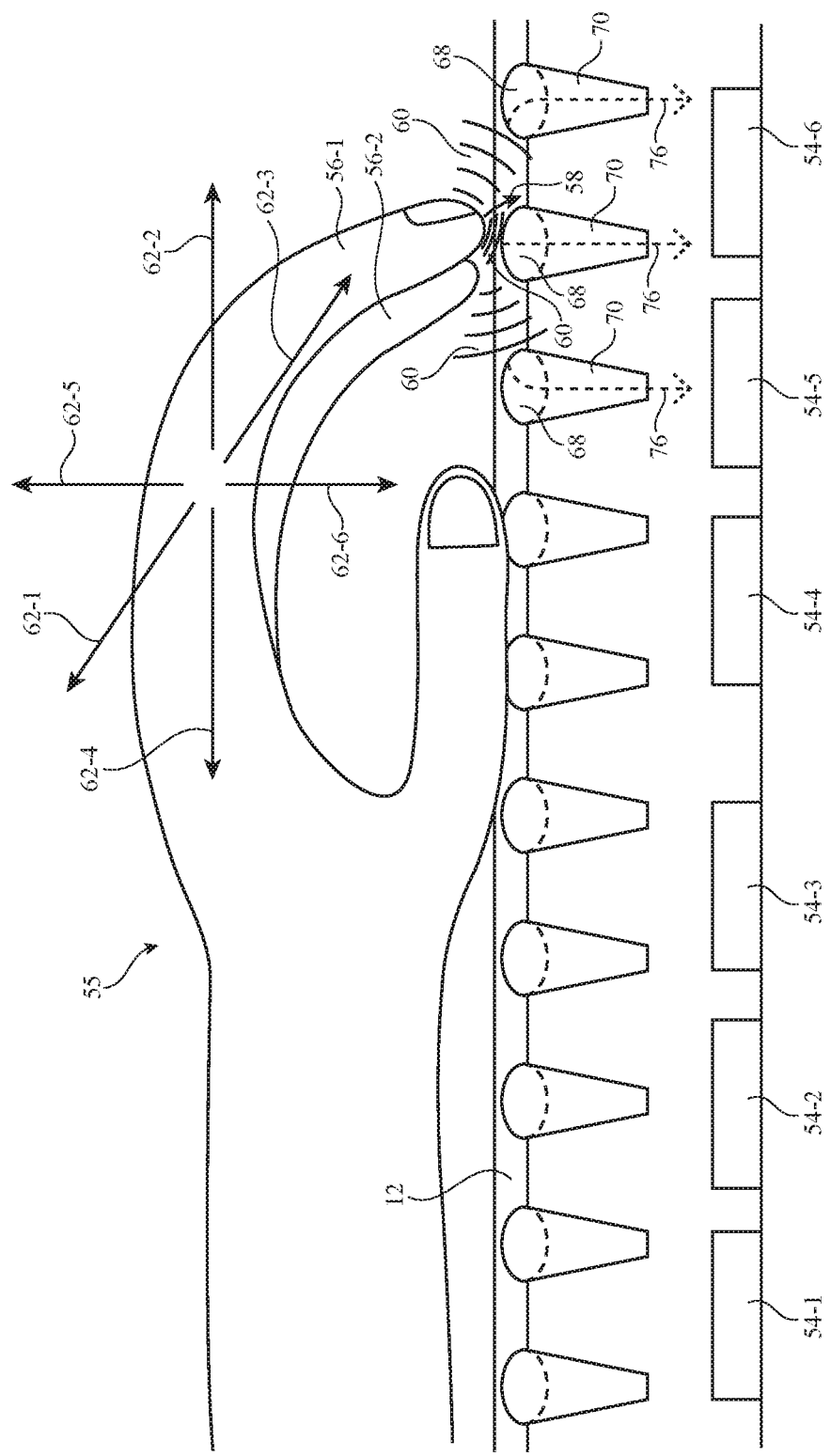
FIG. 7A is a cross-sectional view of an illustrative electronic device having microphones mounted near openings in a housing of the electronic device in accordance with an embodiment.

A cross-sectional view of housing 12 and openings 68 taken along line A-A in FIG. 6 is shown in FIG. 7A. As shown in FIG. 7A, openings 68 may extend partially or completely through housing 12 to form cavities 70 (sometimes referred to herein as paths, transmission pathways, or sound-directing structures). If desired, cavities 70 may be resonant cavities that resonate ambient noise or changes in ambient noise that enter openings 68 and are transmitted through housing 12. An array of microphones 54-1, 54-2, 54-3, 54-4, 54-5, and 54-6 may be formed beneath openings 68 such that ambient noise is directed to the microphones 54 through the openings 68 and cavities 70. When device 10 is simply sitting in an environment (e.g., no user is using the device), each of the microphones 54 in the array may receive ambient noise that is substantially identical and generate similar baseline ambient noise signals.

In the illustrative example of FIG. 7A, openings 68 are shown as circular openings, and cavities 70 are shown as having a conical cross-sectional profile. This is merely illustrative. If desired, openings 68 may have any desired shape, such as rectangular, square, triangular, elliptical, semicircular, or any other suitable polygonal shape. If desired, cavities 70 may be rectangular, may have walls that diverge from openings 68 as the cavity extends through the housing, may have patterned walls, or may have any other suitable cross-sectional profile. If desired, each of the openings 68 and cavities 70 that are formed in a housing 12 may have the same shape, or housing 12 may include openings 68 and cavities 70 having different shapes. For example, housing 12 may include a first group of openings and cavities that have a first shape that is configured to serve as a resonant cavity for a first frequency, or sound that arrives from a first direction, may have a second group of openings and cavities that have a second shape that is configured to serve as a resonant cavity for a second frequency, or sound that arrives from a second direction, and may have a third group of openings and cavities that have a third shape that is configured to serve as a resonant cavity for a third frequency, or sound that arrives from a third direction.

As shown in FIG. 7A, a user 55 may place their hand over a portion of the openings 68 in housing 12. Such a gesture by a user may change the ambient noise that is received at the microphones 54. The microphones 54 may detect these changes in ambient noise, and may determine that a user has placed their hand on the electronic device based on these changes (e.g., by comparing the changes in ambient noise to known changes in ambient noise that are associated with a user placing a hand on the device).

A user 55 may make gestures while using device 10. For example, a user may place one or more fingers 56-1 and/or 56-2 over one or more openings 68 in housing 12, which may cause a change 60 in the ambient noise that is received at the microphones 54 in the array. In the illustrative example of FIG. 7A, a change 60 in the ambient noise is caused by a user placing finger 56-1 over an opening 68. When user 55 places finger 56-1 in this location, the ambient noise that is transmitted to microphones 54-5 and 54-6 (as shown by arrows 76) is changed. In such an example, the gesture made by a user 55 using finger 56-1 may have little to no effect on the ambient noise received at microphones 54-1, 54-2, 54-3, and 54-4. This may be because the gesture was localized to an area not directly above these microphones, and/or because the sound-directing effects of cavities 70 direct the change to only some of the microphones in the array. By comparing the ambient noise data generated by each of the microphones, the location, duration, intensity, and specific finger of the user 55 associated with the gesture can be determined.

In the example described above, changes in ambient noise associated with a user placing a finger over an opening 68 in housing 12 are described. This, however, is merely illustrative. If desired, microphones 54 (e.g., microphones that receive sound through openings 68 and passageways 70) may detect changes in ambient noise due to other user gestures. For example, movement of a user's hand in sideways directions 62-1 and 62-3, forward and backward directions 62-2 and 62-4, and up and down in directions 62-5 and 62-6 may cause changes in ambient noise that are detected by microphones 54-1, 54-2, 54-3, 54-4, 54-5, and 54-6. By using processing circuitry to measure the changes in ambient noise data generated by each microphone and comparing the changes, electronic device 10 may recognize user gestures and activate, deactivate, or otherwise modify a function of the electronic device 10.

If desired, electronic device 10 may be provided with internal walls within housing 12 (sometimes referred to herein as acoustic walls, barriers, acoustic isolation structures, or acoustic steering elements) between one or more microphones 54. As shown in the illustrative example of FIG. 7B, acoustic isolation structures 112 may be interposed between two microphones 54 to prevent changes in ambient noise 60 that are transmitted (as indicated by arrow 76) to first microphone 54-1 from reflecting within housing 12 and being received at a second microphone 54-2. Such an arrangement may be implemented when each of openings 68 and passages 70 has substantially the same size and shape (and therefore transmit and direct ambient noise to respective microphones 54 in similar ways) as a way to prevent cross-talk between the respective microphones. In this way, electronic device 10 may be able to more accurately determine the source (e.g., location, directionality, distance, or type of gesture) associated with changes in ambient noise 60 received at a given microphone. This, however, is merely illustrative. Acoustic isolation structures 112 may serve to isolate microphones 54-1 and 54-2 that are configured to receive different ambient noise changes (e.g., having different frequencies, arriving from different directions, resulting from different gestures, etc.). In this instance, acoustic walls 112 may prevent changes in ambient noise that are intended to be received at one microphone 54-1 from being redirected within housing 12 and inadvertently arriving at microphone 54-2, or vice-versa.

Acoustic walls 112 may have one or more patterned surfaces. Patterned surfaces on acoustic walls 112 may serve to provide acoustic isolation properties to walls 112 (e.g., by simply blocking a passageway between microphones 54-1 and 54-2) or may have acoustic properties that amplify or further encode the ambient noise received at microphones 54-1 and 54-2. In one illustrative example, walls 112 may have protrusions 114 that project from walls 112 to redirect sound waves that begin to move away from microphone 54-1 (due to being reflected within housing 12, for example) back towards microphone 54-1. In this way, wall 112 may serve as an acoustic steering element that redirects or amplifies soundwaves back towards microphone 54-1 (or 54-2) to increase the amount of ambient noise that is received at the microphone and available for sampling.

In another suitable example, protrusions 114 may be configured to encode or modulate ambient noise that is received through openings 68 and passageways 70. For example, a first sound encoding element 112 may have structures 114 that modify incident sound waves in a first way (e.g., a change in frequency, a change in direction, a change in amplitude, etc.) while a second sound encoding element may have structures 114 that modify the incident sound waves in a second way (e.g., a different change in frequency, direction, amplitude, etc.). If desired, acoustic steering elements 112 may be configured to cause constructive or destructive interference between sound ways that are received through openings 68. In one example, a microphone 54 may be configured to only respond to sound waves that have been modulated in a particular manner. In another example, microphone 54 may be able to gather additional information based on the modulation of the sound waves (e.g., which acoustic modulator 112 the sound wave was directed by). This additional information may provide further details regarding changes in ambient noise 60, such as which openings 68 received the ambient noise sound waves, the direction that the sound waves were traveling when they entered the device, or other features of changes in ambient noise 60.

Figure 7B:
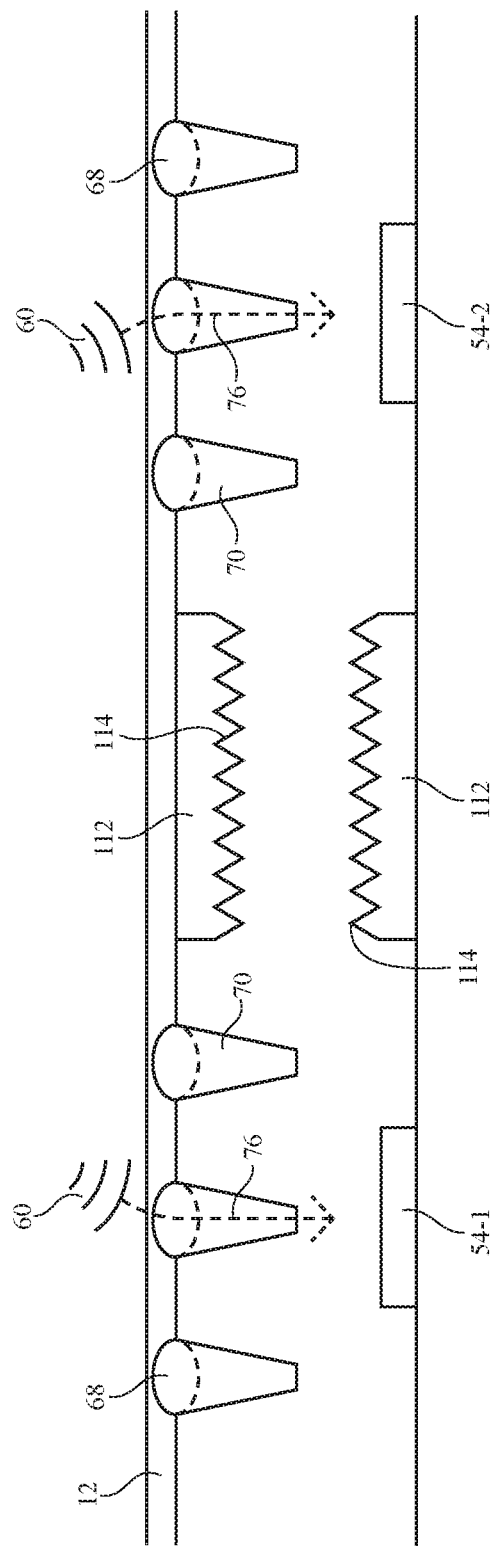
FIG. 7B is a cross-sectional view of an illustrative electronic device having acoustic steering elements mounted in a housing of the electronic device in accordance with an embodiment.

In the illustrative example FIG. 7B, protrusions 114 have a wave-shaped profile. This, however, is merely illustrative. If desired, protrusions 114 may have a triangular, rectangular, hexagonal, octagonal, circular or semi-circular, scalloped, corrugated, or other suitable profile. Protrusions 114 may be formed in any suitable configuration on an internal wall 112 (which may be formed in any suitable configuration within housing 12). Internal walls 112 may be formed between individual openings 68 and/or microphones 54, or may separate groups of microphones or openings. In general, internal walls 112 and protrusions 114 may be provided within device housing 12 in any suitable arrangement to modulate ambient noise that is received at microphones 54.

One or more different types of microphones 54 may be used for ambient noise sensing. The type of microphone may be selected to have a specific directionality (i.e., to be sensitive to sound waves from certain directions) or frequency sensitivity. Microphone 54 may have a unidirectional, bidirectional, omnidirectional, cardioid, sub-cardioid, super-cardioid, hyper-cardioid, hypo-cardioid, shotgun, or other suitable response pattern.

Figure 8:
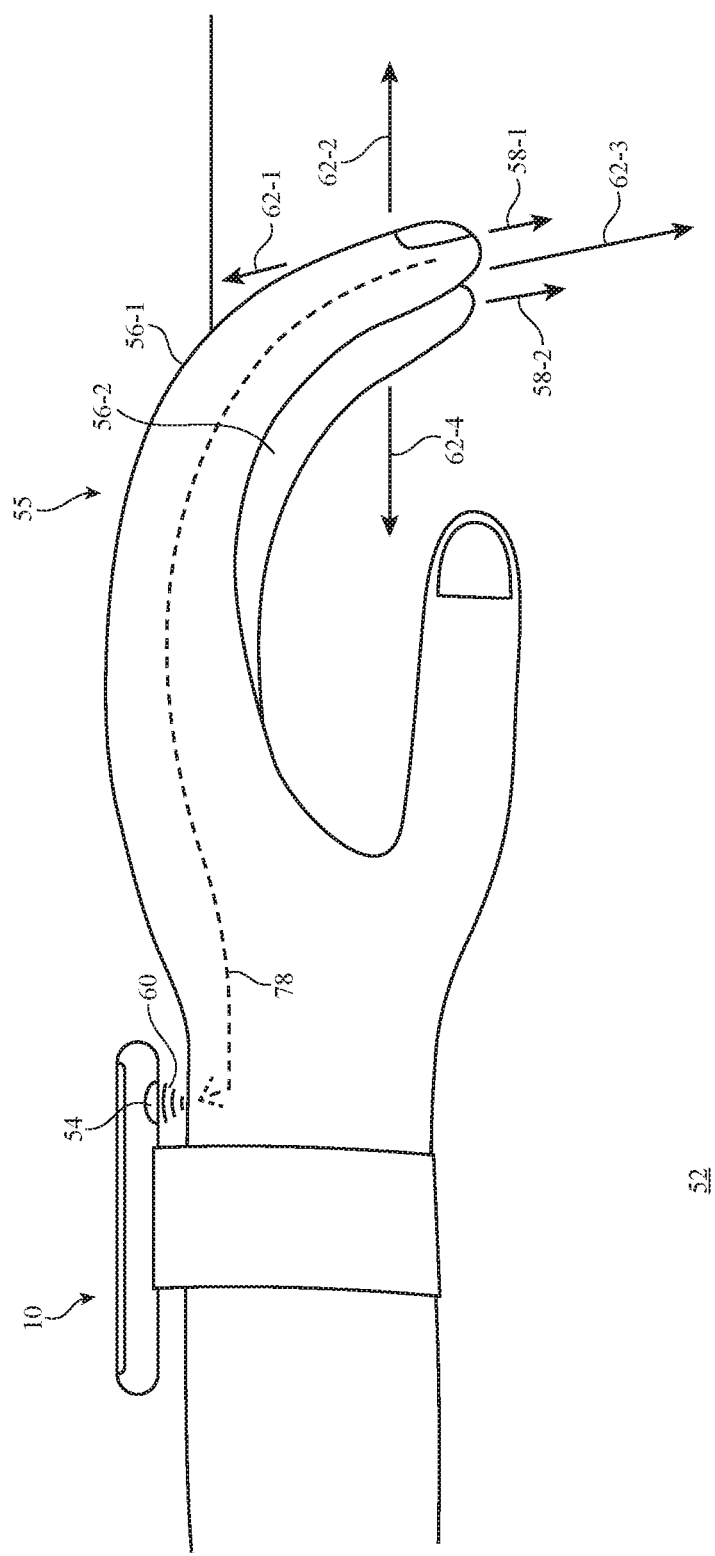
FIG. 8 is a side view of an illustrative electronic device that detects changes in ambient noise caused by a user in accordance with an embodiment in accordance with an embodiment.

An illustrative example of an electronic device 10 that may detect ambient noise using a microphone 54 and perform ambient noise processing to determine changes in the ambient noise is shown in FIG. 8. In the illustrative example of FIG. 8, device 10 is a wearable electronic device such as a watch that is worn on the wrist of a user 55. Microphone 54 is positioned on a bottom surface of the device 10 such that some or all of the microphone faces the body of the user. In such an example, the ambient noise received at microphone 54 may include peaks or troughs at certain frequencies due to the close proximity of microphone 54 to user 55. If desired, the baseline ambient noise profile used by device 10 to determine changes in ambient noise may be based on the modified ambient noise levels received at microphone 54 simply due to the fact that user 55 is wearing device 10.

In the illustrative example of FIG. 8, microphone 54 may detect changes in the ambient noise and generate ambient noise data that reflects the changes. In one scenario, microphone 54 may be able to detect when a user 55 places their hand on surface 52 due to changes in the ambient noise received at the microphone. For example, a microphone 54 and processing circuitry in device 10 may recognize that a user's hand is resting on a surface based on a characteristic ambient noise profile that differs from an ambient noise profile that is detected when a user is walking or has their hand at their side. In response to determining that the user has rested their hand on the surface 52, device 10 may switch operational modes (e.g., may enter an ambient noise sensing and processing mode) that allows device 10 to detect changes in ambient noise associated with user gestures on or around surface 52.

In one suitable example, device 10 may be able to detect user gestures through user 55, as shown by path 78. For example, user 55 may move one of fingers 56-1 in direction 58-1 to place the finger on surface 52. This movement of finger 56-1 may cause movements of the user's wrist and hand, which may cause changes 60 in the ambient noise received at microphone 54. Processing circuitry may process these changes in the data provided by microphone 54 (by comparing them to a baseline ambient noise profile and/or characteristic changes associated with known user gestures, for example), to determine the gesture made by the user. Because movement of finger 56-2 in direction 58-2 may cause different changes in the ambient noise received at microphone 54, processing circuitry may be able to differentiate between gestures made with finger 56-1 and 56-2. If desired, the duration and/or force of the gesture may be determined based on the duration and/or magnitude of the change in ambient noise detected by microphone 54. Movement of fingers 56-1 and/or 56-2 in directions 62-1, 62-2, 62-3, and/or 62-4 may cause changes in the ambient noise received at microphone 54. Processing circuitry in device 10 may be able to determine the direction, velocity, and force associated with these gestures, and accordingly modify the operation of electronic device 10 or another electronic device based on these characteristics.

The examples described above in which microphone 54 detects user gestures based on changes in ambient noise are merely illustrative. If desired, movement of a user's hand in directions 62-1, 62-2, 62-3, and/or 62-4 may generate additional sound waves that may be detected by microphone 54. Similarly, a user may tap fingers 56-1 and 56-2 on surface 52 with sufficient force to produce sound waves that are detected by microphone 54. If desired, sound waves such as these may cause microphone 54 to generate data that differs from a baseline sound level, which may be used to determine user gestures and modify the operation of electronic device 10 or other devices.

The illustrative examples described above in which device 10 is provided with one microphone 54 are merely illustrative. If desired, device 10 may be provided with a plurality of microphones 54, each of which may detect changes in the ambient noise received at device 10 and generate corresponding ambient noise data. Processing circuitry in device 10 or another electronic device may use the data from the multiple microphones to determine the source of the changes in ambient noise and any associated user gestures. If desired, a plurality of microphones 54 may be formed in an array on the bottom surface of device 10, or multiple microphones 54 may be formed on multiple different surfaces of device 10.

Figure 9:
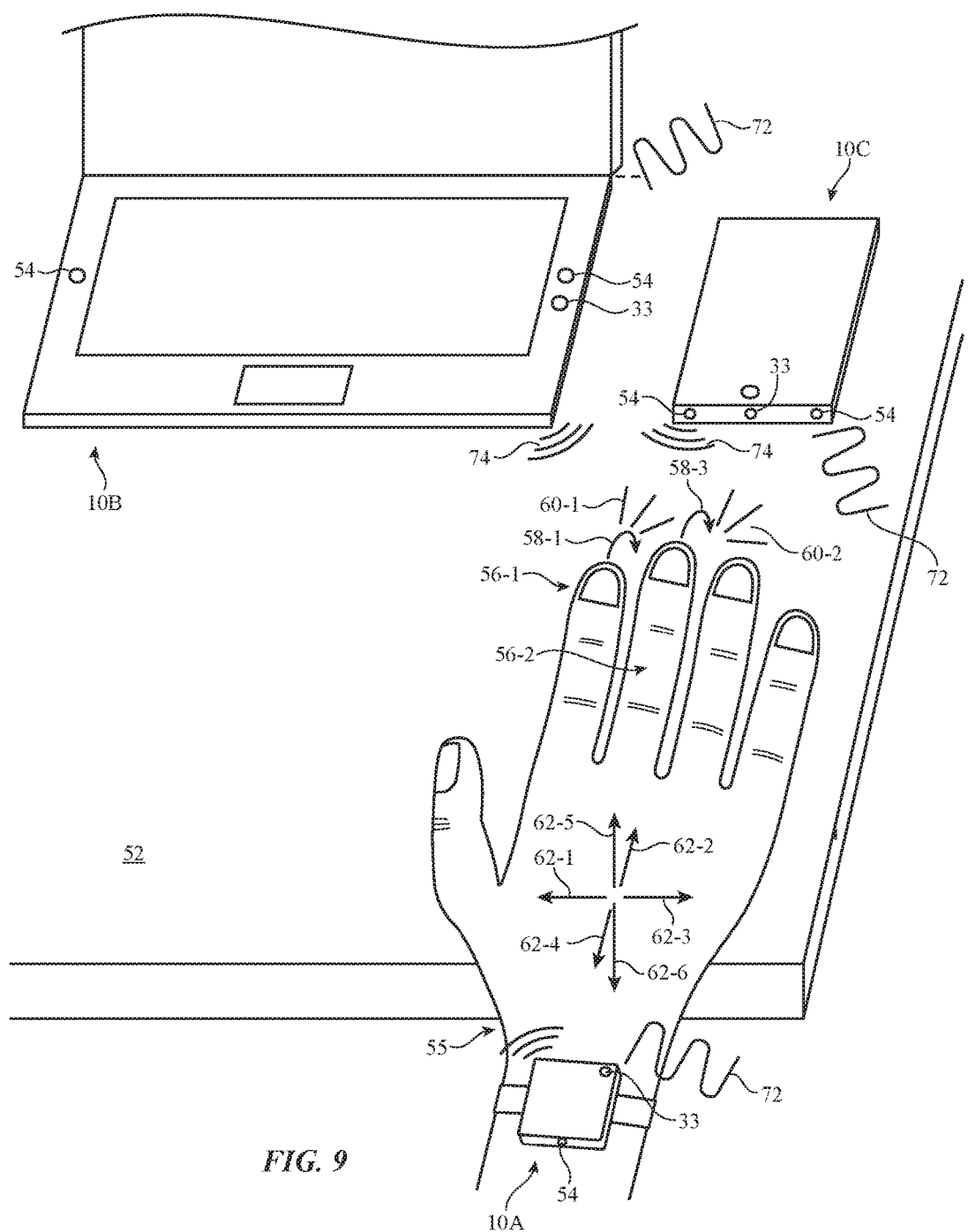
FIG. 9 is a perspective view of multiple electronic devices that communicate changes in ambient noise in accordance with an embodiment in accordance with an embodiment.

An illustrative example of a plurality of electronic devices 10A, 10B, and 10C each having at least one microphone 54 for monitoring ambient noise and detecting changes in the ambient noise is shown in FIG. 9. As described above in connection with FIGS. 1-8, each of devices 10A, 10B, and 10C may detect changes in ambient noise such as changes 60-1 and 60-2 associated with a user placing one or both of fingers 56-1 and 56-2 on or near surface 52 by moving fingers 56-1 and 56-2 in directions 58-1 and 58-2, respectively. Similarly, each of devices 10A, 10B, and 10C may detect changes in ambient noise caused by movement of a user in directions 62-1, 62-2, 62-3, 62-4, 62-5, and 62-6. By processing changes in the ambient noise data generated by microphones 54, devices 10A, 10B, and 10C may determine user gestures associated with the changes in ambient noise and modify operational parameters associated with the device.

If desired, a first device such as device 10A may be used to change the operation of a second device, such as device 10B. For example, device 10A may detect changes in ambient noise using microphone 54 in device 10A, and generate corresponding ambient noise data. Device 10A may then wirelessly transmit the data as a transmission 74 to device 10B, which may process the data to determine the user gestures associated with the changes in ambient noise. Device 10B may then modify operational parameters of device 10B based on the user gestures. In this way, a first device may be used to detect changes in ambient noise, while a second device may change its function based on the changes in ambient noise and associated gestures made by a user. If desired, the first device (e.g. device 10A) may generate and process the data, and simply send commands to the second device (e.g., device 10B) as a wireless transmission 74. In one arrangement, the second device 10B may process the data from the first device 10A, and transmit commands based on the processed data to a third device 10C. This, however, is merely illustrative. In general, any combination of devices 10A, 10B, and 10C may be used to monitor ambient noise and detect changes in the ambient noise, process data signals generated in response to the ambient noise, and modify device operations based on user gestures or other events associated with the ambient noise.

In the illustrative example of FIG. 9, some or all of electronic devices 10A, 10B, and 10C may include one or more speakers 33. Speaker 33 may be used to generate a tone (i.e., speaker 33 may be a tone generator or other audio output component) or other audio signal that may make up some or all of the ambient noise that is used as the baseline ambient noise level by microphones 54 and processing circuitry in devices 10A, 10B, and 10C. For example, device 10B may include a speaker 33 that generates a tone 72, and device 10C may detect tone 72 using microphone 54. If desired, tone 72 may include sound waves of a single frequency or band of frequencies (e.g., an ultrasonic tone), or may include a plurality of different frequencies. Because tone 72 may be provided consistently, it may serve as a stable baseline against which changes may be measured by device 10B.

Although described above in connection with FIGS. 10B and 10C, any one or combination of devices 10A, 10B, and/or 10C may be used to generate and/or detect a baseline tone 72 generated by a speaker 33 in any one of devices 10A, 10B, and 10C. In general, a device 10 may generate a baseline noise profile based on auditory signals 72, or may have a predetermined baseline profile that corresponds to known background signals 72 stored in memory in device 10.

Electronic device 10 may identify a variety of user gestures based on changes in ambient noise that are detected by microphone 54 and processed by processing circuitry in the electronic device. For example, a different change in ambient noise may be associated with the placement of each one of a user's fingers 56 on or near a surface 52 (e.g., a tapping motion). Device 10 may be able to differentiate between each of these changes in ambient noise to determine which finger 56 was placed on the surface as well as the duration, location, and force associated with the placement or tap. In this way, a user may make a clicking gesture simply by tapping their finger on a surface, and the electronic device may respond accordingly by performing a clicking action. A variety of different clicking or similar actions may be performed, such as a double click, right click, left click, two-finger click, three-finger click, four-finger click, five-finger click, and other clicking gestures, each of which may cause a unique change in the ambient noise that can be detected and processed by device 10.

In one suitable arrangement, different changes in ambient noise may be generated based on different movements of a user's hand 57 or fingers 56 along surface 52. For example, the ambient noise detected by microphone 54 may change as a user one or both FIGS. 56-1 and 56-2 move along surface 52 (in directions 62-1, 62-2, 62-3, and 62-4, for example). The change in ambient noise may be different based on whether one or both fingers are used, as well as the direction in which the movement occurs. These changes in ambient noise may be associated with a scrolling or dragging gesture. In response to determining that the change in ambient noise corresponds to a scrolling or dragging gesture, the electronic device 10 may scroll up or down in an application window that is displayed on a display 14, or move an application window from one location on the display to another location on the display.

In one exemplary configuration, a user may bring fingers 56-1 and 56-2 together or farther apart (in a pinching motion, for example). Such a gesture may cause a characteristic change in the ambient noise that is received at microphone 54 such that device 10 can determine that a pinching motion has been made by the user. The change in ambient noise may reflect the direction, duration, force, or other characteristics of the gesture. Accordingly, the electronic device may alter its operation in response to the gesture by zooming in or out with respect display content that is displayed on display 14.

The changes in ambient noise, associated user gestures, and corresponding actions taken by electronic device 10 described above are merely illustrative. In general, one or more microphones 54 and processing circuitry in the electronic device may detect and process changes in ambient noise that correspond to a variety of user gestures that can be used to control or otherwise modify the function of electronic device 10.

If desired, an electronic device 10 may use one more sensors 35 to detect user gestures in combination with ambient noise data generated by microphone 54. In an example in which electronic device 10 is a wearable electronic device, device 10 may use an accelerometer in combination with a microphone 54 to detect user gestures. For example, device 10 may use data generated by the accelerometer to detect movement of device 10 in directions 62-1, 62-2, 62-3, 62-4, 62-5, and 62-6, and may use microphone 54 to detect user gestures such as tapping, sliding, pinching, spreading, and other movements of fingers 56 on a surface 52. In this way, device 10 may detect user gestures that involve movement of the device using a sensor component that detects movement, and may detect user gestures that involve little or no movement of the device using a microphone that detects changes in ambient noise.

A flow chart of illustrative steps that may be performed in accordance with ambient noise monitoring and processing are shown and described in connection with FIG. 10.

At optional step 100, an electronic device 10 may monitor ambient noise using a microphone 54 and generate a baseline ambient noise profile that may be used to detect deviations in ambient noise levels from the baseline. In one example, step 100 may be skipped if electronic device 10 has a pre-established ambient noise profile for a given environment. In another suitable example, the baseline ambient noise profile may include characteristic auditory signatures that are present in whole or in part due to the presence of a nearby device having a textured surface that produces the characteristic auditory signatures.

At step 102, the microphone 54 may generate ambient noise data based on the ambient noise that is received in the electronic device. As changes in the ambient noise occur, the ambient noise data may change and deviate from the ambient noise baseline profile. A nearby device having a textured surface may at least partially modulate the ambient noise to produce the changes.

At step 104, processing circuitry in the electronic device 10 may compare the ambient noise data generated by microphone 54 to the baseline ambient noise profile to determine if a change in the ambient noise has occurred. The differences between the ambient noise data and the ambient noise profile may be used to determine characteristics of the change in the ambient noise. The characteristic changes in the ambient noise may be caused by a nearby device having a textured surface. For example, the textured surface may cause the ambient noise profile to change in a predetermined, characteristic way when a user moves over the textured surface.

At step 106, the processing circuitry may compare the changes in the ambient noise to predetermined characteristic changes in the ambient noise that are stored, for example, in memory in the electronic device. Each characteristic change in the ambient noise may be associated with a corresponding user input. The characteristic change may be associated with a given user input made over the textured surface of a nearby device.

At step 108, the processing circuitry may determine that the change in the ambient noise is similar to or the same as one of the characteristic changes in the ambient noise stored in the memory. Based on the user input associated with the characteristic change, the processing circuitry may determine that the same user input is associated with the detected change in ambient noise and associate the user input with the detected change. The user input may be associated with a characteristic change in the ambient noise that occurs when a user performs a particular gesture over a known textured surface or portion of a textured surface on a nearby device. The processing circuitry may be able to identify the gesture made and the location of the gesture relative to the textured surface based on the detected change in ambient noise.

At optional step 110, the processing circuitry may modify the operation of electronic device 10 based on the user input associated with the change in ambient noise. In one suitable example, the processing circuitry may take no action based on the user input associated with the change in ambient noise.

Figure 10:
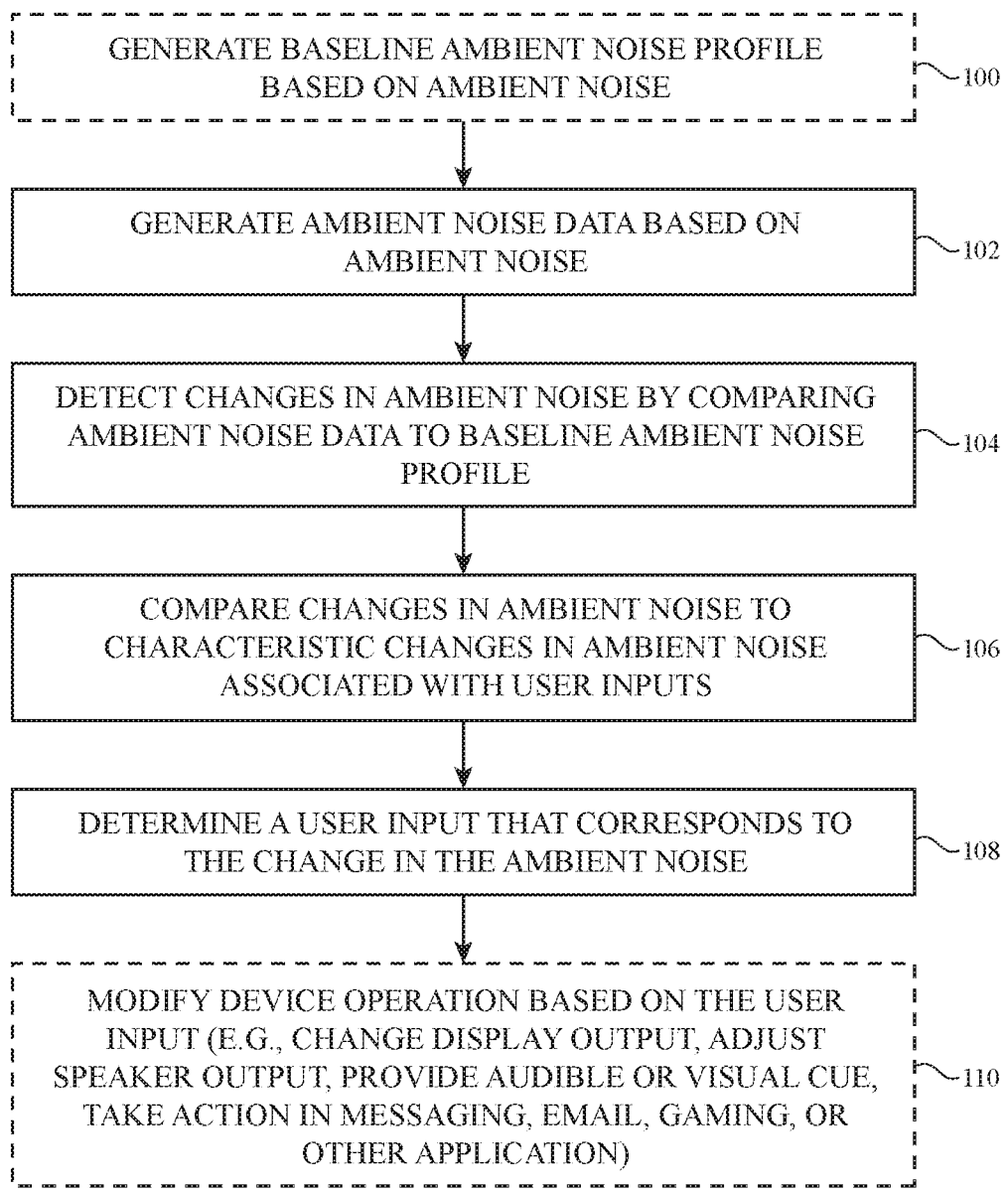
FIG. 10 is a flow chart of illustrative steps that may be performed in connection with ambient noise sensing and processing in accordance with an embodiment in accordance with an embodiment.

In the above description of FIG. 10 above, the textured surface that modulates the ambient noise is described as being on a nearby device. This, however, is merely illustrative. If desired, the textured surface may be on the electronic device itself.

Figure 11:
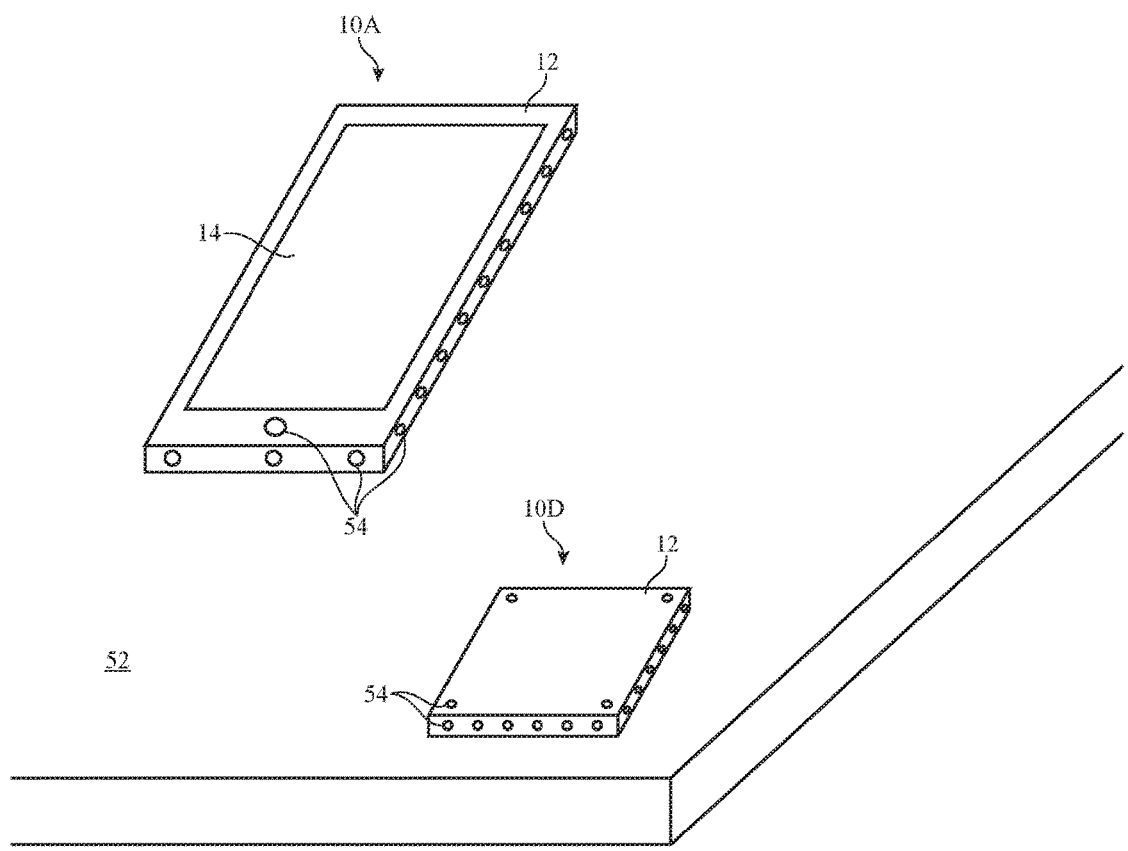
FIG. 11 is a perspective view a first device that produces characteristic changes in ambient noise based on user input and a second device that operates based on the changes in accordance with an embodiment in accordance with an embodiment.

An example of first and second devices that may be used together for ambient noise sensing and detecting changes in the ambient noise is shown in FIG. 11. A first electronic device 10A and a second electronic device 10D may both operate in an environment in which ambient noise (sometimes referred to herein as ambient sound, ambient sound waves, or an ambient sound event) is present. Device 10A may have a plurality of microphones 54 for detecting ambient noise, and a display 14 for displaying images and/or other information to a user. Microphones 54 and display 14 may be mounted in housing 12. In general, electronic device 10A shown in FIG. 11 may be one of electronic devices 10A-10C shown and described in connection with FIG. 1.

Device 10D may operate together with electronic device 10A to monitor ambient noise and detect changes in the ambient noise. In one illustrative embodiment, device 10D includes a housing 12 with surface features or textures that affect the ambient noise around electronic device 10A. In such an example, device 10D may simply serve as an ambient noise modulation device with a predetermined surface patterns that create a known ambient noise profile around electronic device 10A (e.g., device 10D may not be an electronic device). Electronic device 10A may detect the ambient noise profile at least partially created by device 10D and detect changes in the ambient noise profile caused by movement of components within device 10D or movement of external objects relative to device 10D. Device 10D may rest on surface 52.

In another suitable example, device 10D may be an electronic device. In scenarios in which electronic device 10D is provided with electronic circuitry, device 10D may include some or all of the components shown and described in connection with device 10 of FIG. 3. In general, electronic device 10D may include one or more microphones 54 that detect ambient noise. Electronic device 10D may include a processor (e.g., storage and processing circuitry 40) for analyzing ambient noise that is detected by microphones 54. Electronic device 10D may process ambient noise profiles and send the processed data to device 10A in the form of executable instructions (e.g., a user input command), or may send information related to the ambient noise profile (e.g., raw or processed data) to the electronic device 10A for further processing. In scenarios in which device 10D does include electronic components, device 10D may include physical features that affect the ambient noise received by device 10A. For example, electronic device 10D may include physical patterns, textures, movable parts, or other physical components that affect the ambient noise profile detected by electronic device 10D.

Figure 12:
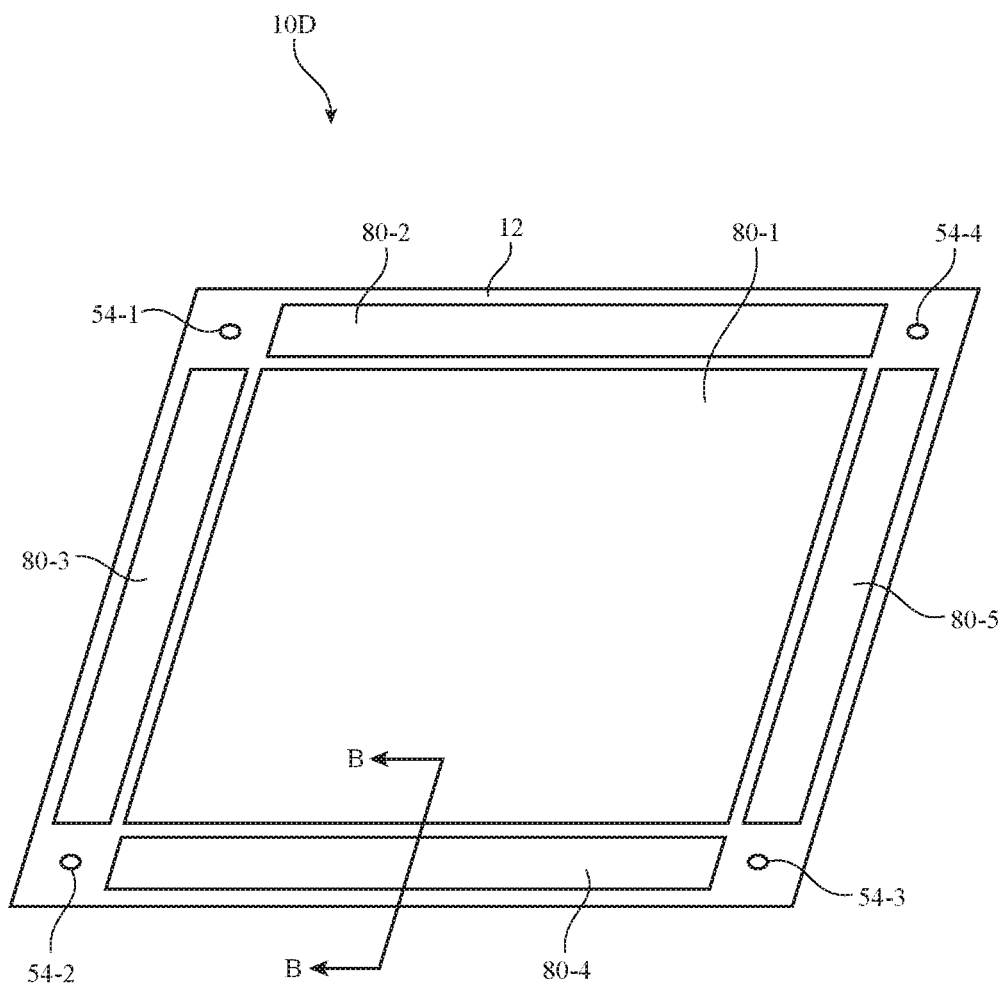
FIG. 12 is a perspective view of a device having surface features that modulate ambient noise in accordance with an embodiment in accordance with an embodiment.

In one suitable example, device 10D may include one or more textured regions 80-1, 80-2, 80-3, 80-4, and 80-5 (sometimes collectively referred to herein as portions 80, planar member portions 80, textured surfaces 80, areas 80, ambient noise-modulating surfaces 80, or patterns 80) as shown in FIG. 12. Some or all of textured regions 80 may be formed from housing 12 as raised portions of housing 12, depressions in housing 12, patterns that are etched or engraved into housing 12, or other suitable modifications to housing 12. Alternatively or in addition to ambient noise-modulating surfaces 80 formed from housing 12, some or all of the features in areas 80 may be separate structures that are attached to the surface of housing 12. For example, ambient noise-modulating features may be formed on the surface of housing 12 using sheets formed of plastic, ceramic, metal, or other suitable materials that are attached to housing 12 using a suitable attachment method (e.g., adhesive).

Ambient noise-modulating regions 80 may have any suitable shape, size, and pattern. For example, regions 80 may include raised portions or depressions having semi-circular, triangular, rectangular, or other suitable cross-sectional profiles, may include straight, zig-zagging, meandering, intersecting, or other suitable patterns of lines, or may include openings (e.g., through-holes or vias) in housing 12. Regions 80 may include features formed in a grid or an array, or may be randomly distributed. In one suitable arrangement, at least one of surface regions 80 (e.g., region 80-1) includes an array of similar features that modify ambient noise near devices 10A and 10D. The density of features in the array may be chosen accordingly to provide a desired modulation of the ambient noise profile. An array of features in a region 80 may include 1, 5, 10, 25, 50, 100, 1,000, 10,000, 100,000, 1,000,000, or more features. The features in regions 80 may be formed with a resolution that is low enough to be physically detectable by a user (e.g., a user can touch and feel the ambient noise-affecting features) or may be formed with a resolution high enough (as microperforations, for example) that the features are not physically detectable by a user.

The patterned physical features in regions 80 may modulate ambient noise in the environment surrounding devices 10A and 10D. The ambient noise profile that exists when device 10D is simply in the same vicinity of electronic device 10A may be detected by electronic device 10A as a baseline ambient noise profile. The baseline ambient noise profile may be a predetermined ambient noise profile that electronic device 10A recognizes as being associated with device 10D. As a user moves relative to device 10D, the ambient noise profile may change from the predetermined ambient noise profile recognized by device 10A. For example, a user may move their hand over region 80-1 to cause a change in the ambient noise received at electronic device 10A. Electronic device 10A may be programmed to identify such a change in the ambient noise profile as being due to movement relative to region 80-1 (rather than due to user movement over another one of regions 80-2, 80-3, 80-4, or 80-5, for example) and may respond accordingly. Similarly, electronic device 10A may be programmed to separately identify changes in the ambient noise profile due to movement relative to regions 80-2, 80-3, 80-4, and 80-5. In general, electronic device 10A may capable of differentiating between the different locations on device 10D over which a user is moving or making a gesture based on the relative distance between device 10A and the different locations on device 10D. If desired, the patterns, textures, and other physical features of regions 80 may provide additional or improved ambient noise signatures as a user moves over each of the regions. These signatures, or characteristic changes in ambient noise, may allow electronic device 10A to determine where a user is gesturing over device 10D with increased resolution, accuracy, and detail. In general, the features in region 80 may allow for device 10A and/or device 10D to better discriminate changes in ambient noise caused by a user against background fluctuations in the ambient noise profile.

Two or more of textured surfaces 80-1, 80-2, 80-3, 80-4, and 80-5 may have the same pattern (i.e. a uniform pattern on a surface of housing 12), or each of the textured surfaces may be patterned differently. In one illustrative example, textured surfaces 80-2, 80-3, 80-4, and 80-5 are all patterned substantially identically (e.g., using the same physical feature, pattern, and density), while textured surface 80-1 may be patterned differently (e.g., using a different physical feature, pattern, and/or density that the other four textured surfaces 80).

In one suitable example, ambient noise modulation device 10D may be a planar member (sometimes referred to herein as a pad or mat) with a rectangular perimeter having four edges. A first planar member portion 80-1 may form a central region on the surface of ambient noise modulation device 10D, and a second planar member portion 80-4 may form a strip between the central region and one of the four edges. If desired, third, fourth, and fifth planar member portions 80-2, 80-3, and 80-5 may form third, fourth, and fifth strips between the central region and each of the other edges of planar member that forms ambient noise modulation device 10D.

Electronic device 10A may recognize changes in the ambient noise profile (using a microphone 54, for example) as being associated with movement relative to a given one of regions 80-1, 80-2, 80-3, 80-4, or 80-5, and may perform an associated function. For example, movement of a user relative to region 80-1 may be used as a mouse or trackpad functionality. Movement of a user relative to region 80-1 may cause a cursor to move across a screen 14 on device 10A, or may be used to select portions of display 14 in accordance with user-selectable options. Gestures made by a user relative to regions 80-2, 80-3, 80-4, and/or 80-5 may be used for horizontal scrolling across a display 14, adjusting the volume of speakers included in device 10A, adjusting the brightness of display 14, or other suitable functions. User gestures performed over region 80-4 may cause device 10A to perform a click or select function. This, however, is merely illustrative. Movement of a user relative to any one of regions 80 may cause electronic device 10A to perform any suitable function. The function performed by device 10A may be pre-programmed, or may be customized by a user.

As described above in connection with FIG. 16, device 10D may not include any electronic components (i.e., device 10D may consist only of a housing 12 with surface features in regions 80 thereon). This, however, is merely illustrative. If desired, device 10D may include electronic components such as one or more microphones 54. As shown in FIG. 12, microphones 54-1, 54-2, 54-3, and 54-4 (sometimes collectively referred to herein as microphones 54) may be formed at four corners of device 10D. Microphones 54 may detect ambient noise in the environment of devices 10A and 10D. In particular, one or more of microphones 54-1, 54-2, 54-3, and 54-4 may detect the baseline ambient noise profile that is at least partially determined by the surface features in ambient noise-modulating areas 80 on device 10D. As a user moves relative to the surface features in region 80, the microphone(s) 54 in device 10D may detect changes in the ambient noise profile, and may be able to determine the location of the gesture relative to the various regions 80 due to the different locations and different physical features of the regions 80. In this way, device 10D may serve as a standalone user input device that detects changes in ambient noise, processes the changes to determine a user input or gesture that was performed, and transmits the user input or gesture information to electronic device 10A (using wireless or wired communications, for example) for further processing or to cause device 10A to perform a function.

In one suitable arrangement, some or all of electronic device 10D may be touch-sensitive. For example, electronic device 10D may be touch sensitive in one or more regions 80 on the surface of housing 12. In general, the entire surface on which surface features 80 are formed may be touch sensitive, or only one of the regions 80 (e.g., region 80-1) may be touch sensitive, while surrounding regions 80 are not touch-sensitive. Touch sensitivity may be provided using capacitive touch sensor electrodes mounted within housing 12, using resistive force sensing components within housing 12, using optical touch sensing components (e.g., visible or infrared light emitters and receivers) that transmit light through housing 12 or through openings in housing 12, or using any other suitable touch sensing arrangement. In arrangements in which device 10D is provided with a touch sensor, device 10D may detect touch inputs and transmit the touch inputs to electronic device 10A. The touch inputs and inputs detected using ambient noise profiles that are modulated by surface features in ambient sound-modulating regions 80 may be used in conjunction with one another (e.g., a single input may have a touch component and an ambient noise sensing component), or may be used separately to perform different inputs (touch inputs may be used to move a cursor on a display 14 of device 10A, while ambient noise-based inputs may be used to adjust volume and screen brightness, for example). If desired, a given region 80 such as region 80-1 may be used for both touch-based inputs and ambient noise-based inputs.

In general, device 10D may be a stand-alone device, or may be incorporated into another device or structure (i.e., another inanimate object). For example, the textured surfaces and other features of device 10D may be incorporated into the interior or exterior of a vehicle, the surface of an appliance, the surface of a piece of furniture, interior or exterior walls of a building, or any other suitable object. If desired, coded ambient noise modulation surfaces may be formed by applying a spray or coating to a wall, floor, or other suitable surface. In another example, device 10D may be formed of fabric having a weave or texture that provides ideal ambient noise modulation. Device 10D may also be a flexible device that can be rolled onto a wall, table, rug, or other surface that may not provide an optimal ambient noise sensing environment on its own. Device 10D may then be rolled up for folded to provide a portable device.

Figure 13:
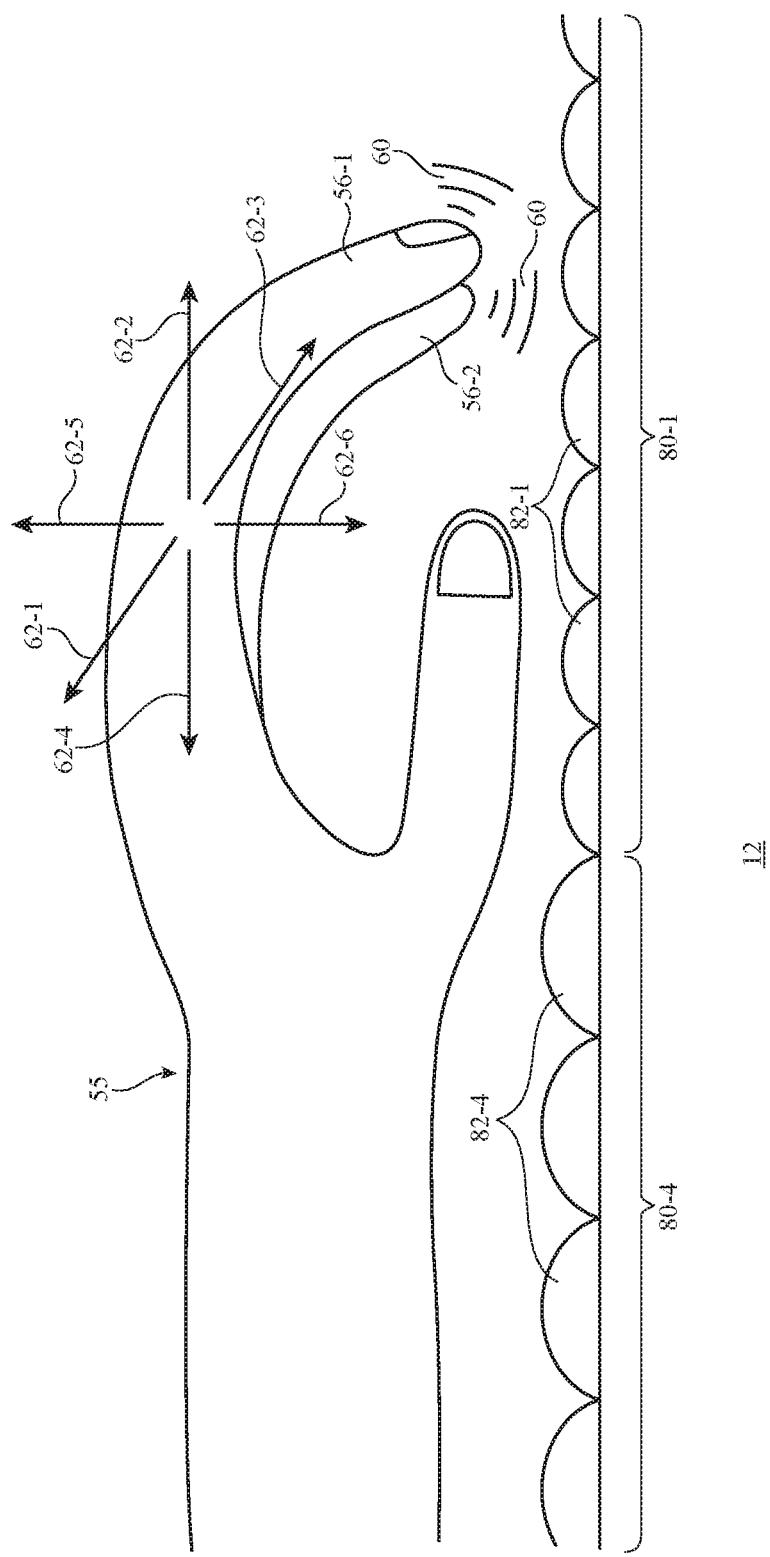
FIG. 13 is a cross-sectional view of a device having surface features that modulate ambient noise and a user's hand positioned above the surface features in accordance with an embodiment in accordance with an embodiment.

A cross-sectional view of device 10D taken along line B-B in FIG. 12 is shown in FIG. 13. As described above in connection with FIG. 12, a first region 80-1 of housing 12 may include a first group of surface features 82-1 and a second region 80-4 of housing 12 may include a second group of surface features 82-4. As shown in FIG. 13, features 82-1 may include rounded protrusions having a first size and pitch, while features 82-4 may include rounded protrusions having a second size and pitch. Although shown as rounded protrusions in FIG. 13, features 82 in regions 80 may generally have any shape, size, pattern, and density, as described above in connection with FIG. 12.

As a user 55 moves their hand or fingers 56-1/56-2 relative to regions 80, changes 60 in the ambient noise profile may occur. For example, if a user holds their hand over region 80-1, a first change 60 in the ambient noise profile may occur due to the shape, size, density, or other characteristics of features 82-1. Microphones 54 on electronic device 10A and/or microphones 54 on device 10D may detect these changes and determine that the changes in the ambient noise profile are due to the position or movement of an object over region 80-1. Similarly, if a user holds or swipes their hand over region 80-4, a second change 60 in the ambient noise profile may occur. The shape, size, density, and other characteristics of features 82-4 may cause the change in the ambient noise profile to be different than that which results when a user performs a gesture over region 80-1. Microphones 54 on device 10A and/or 10D may detect these changes, and may be configured to determine the location and type of a gesture relative to device 60 based on the different ambient noise profile changes that result based on whether the gesture was performed over region 80-1 or 80-4. In this way, device 10D may be provided with a "coded" housing surface that causes characteristic changes in ambient noise that are recognized by device 10A and/or device 10D as being associated with the position of a user relative to a specific region of device 10D.

In one example, device 10D may be provided with different types of textures overlaid onto one another. In addition to a uniform array of textured surface features, for example, device 10D may be provided with a second set of graded surface features that extend along the electronic device. For example, a second set of surface features (e.g., square depressions) may be overlaid upon or interleaved between a first set of semi-spherical surface features. The second set of surface features may have a density or pitch that increases along an axis of device 10D. With such an arrangement, device 10D may help to create a characteristic environment for ambient noise sensing and provide different characteristic changes in ambient noise depending on where a user performs a gesture relative to the surface of device 10D.

In some arrangements, the individual textured elements on a textured surface may have different length and width dimensions. The textured elements may be arranged in aligned rows and columns, or may be formed in offset rows and columns. Graded textures may be used without other underlying, overlaid, or interspersed surface textures. Graded textures may include surface features with a pitch that gradually changes (i.e., the distance between individual features increases or decreases) along an axis parallel to the plane defined by the planar surface of device 10D on which the surface features are formed. If desired, the density of features in a graded texture may increase as distance to an electronic device that is performing ambient sound sensing increases. Such graded textures may provide more robust ambient noise signatures to account for the farther distance from the electronic device. The speed, direction, and other characteristics of a user gesture performed over such textured elements may be determined by processing the unique changes in the ambient sound environment caused by the different dimensional, spatial, and gradient characteristics of the textured surface elements.

The examples described above in which changes in ambient noise are caused by the positioning of the hand of a user 55 over device 10D are merely illustrative. If desired, changes in ambient noise may be caused by direct contact between a user 55 and the surface of device 10D. For example, a user may place finger 56-1 on the surface of housing 12 in region 80-1 such that finger 56-1 rests on features 82-1. The placement of a user's finger in this location may cause a change in the ambient noise profile (without generating sound when the finger 56-1 contacts housing 12, for example) that is different than that caused simply by a user 55 positioning their hand above region 80-1 or 80-4. Similarly, a user may place a finger 56-2 on a feature 82-4 in region 80-4 to generate yet another unique change in the ambient noise profile. A variety of unique changes may occur in response to a user holding their hand or fingers 56-1/56-2 in a stationary position or by moving their hand or fingers 56-1/56-2 relative to regions 80-1 or 80-4 with or without contacting the surface of housing 12. As the surface features in region 80 may provide a consistent, known surface, device 10A and/or device 10D may be programmed to recognize a variety of changes in ambient noise as corresponding to specific gestures made in or over given regions 80 of device 10D. The inputs to which specific ambient noise changes correspond to be may predetermined, or may be programmable by a user. In one suitable example, electronic device 10A and/or electronic device 10D can "learn" associations between ambient noise changes and gestures relative to specific regions 80 through a calibration process in which a user performs gestures over one or more regions 80 and the device records the associated change in ambient noise. The user may then, if desired, program the device to associate specific detected changes with specific user inputs or other device functions.

Figure 14:
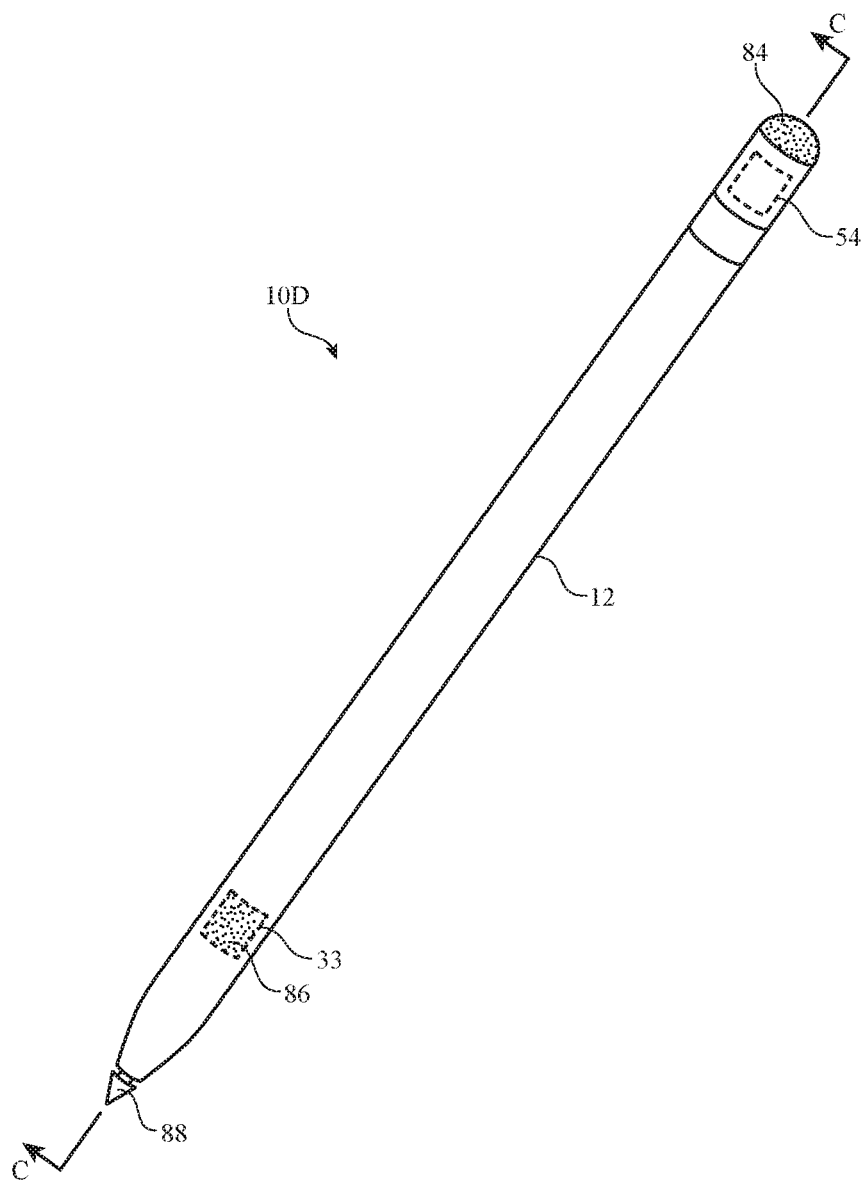
FIG. 14 is a perspective view of a stylus that causes changes in ambient noise in accordance with an embodiment.

In one suitable example, device 10D may be a stylus. As shown in FIG. 14, stylus 10D may have an elongated housing 12 having first and second opposing ends. In one suitable example, housing 12 has a cylindrical shape that extends along a longitudinal axis of stylus 10D. A tip portion 88 may be formed at one end of stylus 10D. An opposing end of stylus 10D opposite the tip portion 88 (i.e., along the longitudinal axis) may include a plurality of openings 84 in housing 12. Openings 84 (e.g., holes or vias) may form a grille, grating, or mesh at the opposing end of stylus 10D that allows sound waves (e.g., ambient noise) to enter housing 12. A microphone 54 or other electronic component may be mounted within housing 12 at the opposing end of stylus 10D. In one suitable example, microphone 54 is mounted adjacent the openings 84 in housing 12 such that sound waves that enter housing 12 through openings 84 are received at microphone 54. This, however, is merely illustrative. If desired, microphone grille 84 and a corresponding microphone 54 may be formed in any suitable location on housing 12.

Stylus 10D may include an additional plurality of openings 86 that form an additional grille, mesh, or grating in housing 12. In the illustrative example of FIG. 14, openings 86 are formed in housing 12 near tip portion 88. In one suitable arrangement, stylus 10D includes an electronic component such as a speaker 33 adjacent mesh 86. In this way, the plurality of openings may form a speaker grille 86 that allows sound waves generated by speaker 33 to exit housing 12. In one suitable example, speaker 33 may generate sound that is audible to a user of stylus 10D. In another suitable arrangement, speaker 33 may be a tone generator that generates sound that is not audible to a user of stylus 10D (e.g., ultrasonic tones). In general, audio-producing component 33 may produce sound waves that make up all or part of a background ambient noise profile in an environment in which stylus 10D is operated. In one suitable arrangement, microphone 54 in stylus 10D may detect the baseline ambient noise profile (all, some, or none of which may be generated by tone generator 33) and may detect changes in the ambient noise profile caused by movement of stylus 10D or movement of a user (e.g., movement of a user relative to stylus 10D).

If desired, stylus 10D may be used together with an electronic device 10A. In such an arrangement, either one or both of devices 10A and 10D may sense an ambient noise profile and changes in the ambient noise profile. For example, device 10A may detect changes in ambient noise caused by a user using stylus 10D. Because the shape, size, surface texture, and other physical characteristics of stylus 10D may be known (e.g., known or programmed into device 10A and/or device 10D), stylus 10D may produce characteristic changes in ambient noise when moved relative to device 10A or used in specific ways by a user. Changes in ambient noise caused by a known device (e.g., stylus 10D) may have predetermined characteristics that may be easier for device 10A to recognize when compared to changes generated simply by a user's hand or fingers, which may vary significantly from user to user and generate a wide variety of changes in the ambient noise.

In another suitable example, device 10D may detect changes in ambient noise. For example, microphone 54 may be used to detect changes in ambient noise caused by movement of stylus 10D or one or more components of stylus 10D, or changes in ambient noise caused by movement of a user relative to stylus 10D (e.g., movement of a user's hand or fingers along housing 12 of stylus 10D). In general, electronic device 10A and stylus 10D may be in wireless communication with each other to communicate changes in ambient noise detected by either device, to communicate commands to the other electronic device based on changes in ambient noise detected by either device, or to otherwise allow for the transmission of information between electronic device 10A and electronic device 10D. If desired, an electronic device 10D such as a stylus may be used together with a device having a housing surface with coded surface features such as that described above in connection with FIGS. 5 and 6. The known arrangement and characteristics of features on the coded housing surface, combined with the known changes in the ambient noise profile generated by stylus 10D, may allow for similar changes in ambient noise to be detected, even when different users are making a given gesture.

If desired, device 10A may generate a tone that makes up some or all of the ambient noise profile detected by stylus 10D. For example, device 10A may be a mobile telephone, a tablet, a wristwatch or other wearable device, or a computer (e.g., a laptop or desktop computer), having a speaker that generates sound (using a tone generator 33, for example) that is detected by stylus 10D as the ambient noise profile. This, however, is merely illustrative. If desired, stylus 10D may generate the baseline ambient noise profile (using speaker 33, for example), while device 10A may detect changes in the ambient noise caused by movement of device 10D relative to device 10A (based on changes in the detected tone due to the Doppler effect, for example), or movements of a user relative to device 10A and/or device 10D.

Figure 15:
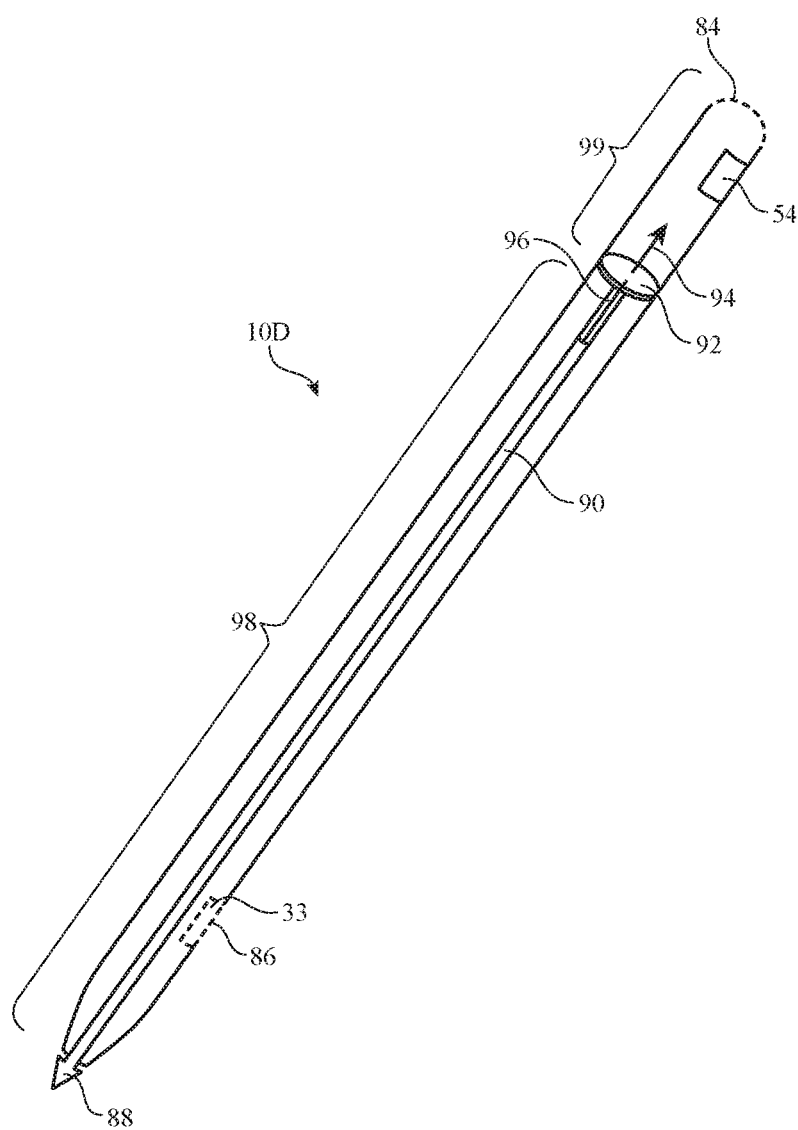
FIG. 15 is a cross-sectional view of a stylus that detects changes in ambient noise in accordance with an embodiment.

A cross-sectional side view of stylus 10D taken along line C-C in FIG. 14 is shown in FIG. 15. As described above in connection with FIG. 14, stylus 10D may include a microphone 54 mounted within housing 12 that receives sound through openings 84 in housing 12. Audio source 33 may generate sound that exits housing 12 through openings 86 in housing 12.

Tip portion 88 of stylus 10D may be connected to shaft 90 within housing 12. In one illustrative example, tip 88 and shaft 90 form a single continuous structure, part of which is external to housing 12 (i.e., tip 88) and part of which is contained with housing 12 (i.e., shaft 90). In another suitable arrangement, tip 88 and shaft 90 may be discrete components coupled together. A disc-shaped head portion 92 (sometimes referred to herein as a plunger, stopper, or disc) may be formed within housing 12 opposite tip portion 88. Stopper 92 may be formed integrally with shaft 90 and/or head portion 92, or may be formed separately from shaft 90 and/or head portion 92 and attached to these components. Stopper 92 may be circular and may have a circumference that is the same as or larger than the circumference of cylindrical housing 12 such that stopper 92 contacts inner surfaces of housing 12 to form a seal within housing 12. In this way, stopper 92 may separate the interior of housing 12 into a first portion 99 and a second portion 98. This, however, is merely illustrative. In general, head portion 92 may have any suitable shape, and need not physically contact housing 12 to separate the lower portion 98 from upper portion 99. In general, head portion 92 may at least partially fill the circumference of housing 12 to separate lower portion 98 from upper portion 99.

When pressure is applied to tip portion 88, tip portion 88 may move towards and away from the end of housing 12 in to which tip portion 88 is inserted. For example, as a user presses tip portion 88 against a surface, tip portion 88 may move within housing 12 such that tip portion 88 is further inserted into housing 12. When a user pulls stylus 10D away from a surface against which tip portion 88 is pressed, tip portion 88 may project out of housing 12 due to the reduction of pressure on tip portion 88.

As tip portion 88 is attached to shaft 90 and head portion 92, movement of tip 88 may cause movement of shaft 90 and head portion 92 within housing 12. For example, applying pressure to tip portion 88 may cause shaft 90 and stopper 92 to move upwards towards the end of stylus 10D (in direction 94) opposite tip portion 88, decreasing the size of upper portion 99 and increasing the size of lower portion 98 within housing 12. Relieving the pressure applied to tip portion 88 may cause shaft portion 90 and head portion 92 to be restored to their original positions (i.e., the position that they are in when no pressure is applied to tip portion 88) by moving within housing 12 in direction 96. In this way, tip portion 88, shaft 90, and head portion 92 may form a movable member within housing 12.

Movement of stopper 92 towards the tip end of housing 12 in which tip portion 88 is inserted may increase a dimension such as the size (volume) of upper portion 99 (sometimes referred to herein as cavity 99, resonant cavity 99, tube 99, closed tube 99, or chamber 99) within housing 12 while decreasing the size (volume) of internal cavity 99 within housing 12. Changes in the dimensions of interior cavity 99 between different values (e.g., first, second, and third different values corresponding to lengths, widths, volumes, etc.) may cause changes in the auditory properties of cavity 99. For example, movement of stopper 92 in direction 94 may decrease the length and volume of resonant cavity 99, and increase the resonant frequency of cavity 99. Movement of stopper 92 in direction 94 may increase the length and volume of resonant cavity 99, and decrease the resonant frequency of cavity 99.

As the resonant frequency of chamber 99 changes, microphone 54 may detect different peaks in the sound waves that it receives. In one illustrative example, microphone 54 may detect a baseline ambient noise profile when stopper 92 is in a first position (e.g., when no pressure is applied to tip 88). When stopper 92 is in this first position, chamber 99 may resonate in response to a first frequency that is present in the baseline ambient noise profile. Accordingly, microphone 54 may detect a peak at this frequency. In this way, stylus 10D may determine that no pressure is applied to tip 88 in response to microphone 54 detecting a peak at the first resonant frequency.

When stopper 92 moves in direction 94 in response to pressure applied to tip 88, resonant cavity 99 may become shorter and resonate at a second frequency that is different than the first resonant frequency. When the ambient noise profile includes components at the second resonant frequency, cavity 99 may resonate, and microphone 54 may detect peaks at the second resonant frequency. Stylus 10D may determine that a first amount of pressure is being applied to tip 88 in response to microphone 54 detecting peaks at the second resonant frequency.

As more pressure is applied to tip 88 and stopper 92 continues to move within housing 12 in direction 94, the length of cavity 99 may continue to shorten, further changing the resonant frequency of the cavity. Cavity 99 may resonate at a third resonant frequency when stopper 92 is moved to a third position within cavity 99. An ambient noise profile that includes frequencies at the third resonant frequency of cavity 99 may cause cavity 99 to resonate. Microphone 54 may detect peaks at the resonant frequency of cavity 99, thereby indicating that stopper 92 is in a third position due to a second amount of pressure that is applied to tip 88.

As described above, movement of head 92 within housing 12 may cause chamber 99 to resonate in response to different frequency components within the ambient noise profile. When an ambient noise profile includes a variety of frequency components, cavity 99 may resonate when stopper 92 is moved to a position within cavity 99 that adjusts the resonant frequency of cavity 99 to one of the variety of frequencies in the ambient noise profile. By detecting peaks at the resonant frequency with microphone 54, stylus 10D may determine the position of stopper 92 within housing 12, and therefore determine an amount of pressure that is applied to tip 88. If desired, the resonant frequency of chamber 99 at a variety of lengths may be predetermined and programmed into device 10D. In this way, stylus 10D may automatically associate peaks detected by microphone 54 with specific amounts of pressure applied to tip 88. In another example, a calibration process may be performed in which the position of stopper 92 within housing 12 is changed to a variety of different positions, and the peaks in the ambient noise profile detected by microphone 54 are associated with the position of stopper 92 and an amount of pressure applied to tip 88 when the various peaks are detected. Calibrating stylus 10D to associate resonant peaks in the ambient noise profile with positions of stopper 92 within housing 12 may allow for stylus 10D to determine an amount of pressure applied to tip 88 based on ambient noise.

In one suitable arrangement, the ambient noise received at microphone 54 may be ambient noise generated within the environment in which stylus 10D is used. In another suitable example, tone generator 33 may generate one or more tones that make up all or some of the ambient noise profile received at microphone 54. In this way, an ambient noise profile that includes sound at some or all of the possible resonant frequencies for chamber 99 may be generated, allowing for increased resolution when detecting the amount of pressure applied to tip 88. If desired, speaker 33 may be used to generate an ambient noise profile during calibration operations for stylus 10D, or another electronic device such as electronic device 10A (e.g., a laptop, mobile telephone, wristwatch device, tablet, or other suitable electronic device) may generate tones that make up some or all of the ambient noise profile detected by microphone 54.

Stylus 10D may use the determined pressure applied to tip 88 to implement device operations in stylus 10D or device 10A. In one suitable arrangement, stylus 10D may take a specific action in response to detecting a given tip pressure based on ambient noise sensed using microphone 54, such as powering the stylus 10D on or off, causing speaker 33 to produce a given sound, or activating or deactivating one or more functions of stylus 10D (e.g., touch sensitivity, visual indicators on or produced by stylus 10D, auditory indicators produced by stylus 10D, communication with one or more other electronic devices, etc.). In another suitable example, stylus 10D may communicate a pressure reading for tip 88 based on ambient noise received at microphone 54 to electronic device 10A for further processing or to cause device 10A to perform a given function. In an illustrative example in which device 10A includes a display 14 with touch sensitivity, device 10A may perform different functions based on the amount of pressure that stylus 10D senses at tip 88 (i.e., the amount of pressure that a user applies to tip 88 against the display). Device 10A may change the way it generates or displays visual content, the way it presents audio content, the volume of speakers in device 10A, the brightness, contrast, or touch sensitivity of display 14, or other suitable characteristics and functions of device 10A. In general, device 10D may affect changes in the operation of drawing, painting, messaging, email, internet browsing or other applications running on device 10A in response to the amount of pressure sensed at tip 88 based on ambient noise measurements.

Figure 16:
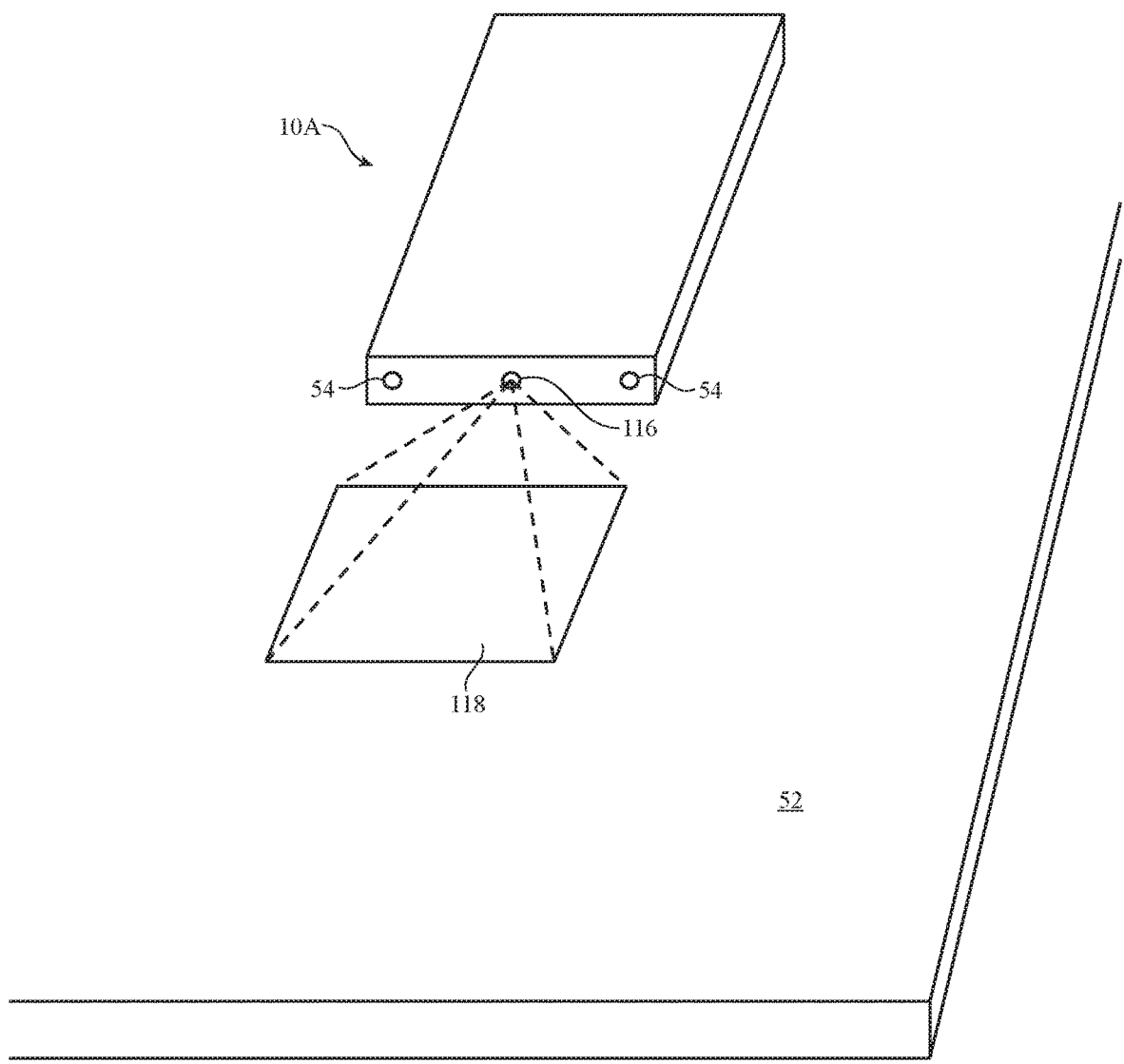
FIG. 16 is perspective view of an electronic device having an indicator that provides feedback on the ability of the electronic device to perform ambient noise sensing in accordance with an embodiment.

An electronic device 10A that performs ambient noise sensing may provide visual indicators 104 to direct a user to perform gestures or movements in a particular location near device 10A. In the example of FIG. 16, electronic device 10A includes a light source 102 that generates indicator 118 (sometimes referred to herein as an indicator graphic, projection, ambient noise sensing area, visual indicator, visible indicator, or visual outline) that is projected onto a surface on which electronic device 10A rests. The ambient noise sensing area 118 illuminated by light source 116 may indicate the ideal area around electronic device 10A in which changes in ambient noise are most likely to be detected by microphones 54. In the illustrative example of FIG. 16, the ambient noise sensing area is a rectangular region on the surface 52 on which device 10A rests. This, however, is merely illustrative. Visual ambient noise sensing area indicator 118 may have any suitable shape, size or graphic. For example, indicator 118 may have a triangular, circular, or any other suitable shape, may be illuminated using solid lines, dashed lines, or dots at one or more corners of the ambient noise sensing area, may include illumination in some or all of the area bound by the lines or dots that define the edges of the area, and may include light of one or more colors.

In one suitable arrangement, indicator 118 may include a graphic such as a virtual keyboard that is projected onto surface 52. When a user places a finger on the portion of indicator 118 that corresponds to a key, a characteristic change in ambient noise may be detected by microphones 54. Microphones 54 may be able to determine the location at which a user placed their finger based on the characteristic change in ambient noise, and may associate the location with a particular key in the keyboard. In this way, a user may be able to type or provide other input to device 10A by simply touching illuminated locations of the surface 52 on which device 10A rests. By relating characteristic changes in ambient noise to specific locations relative to device 10A, device 10A may use a "map" of ambient noise changes to determine where a user has touched surface 52 and perform a suitable function in response to the user input.

The examples above in which indicator 118 is a projection on surface 52 are merely illustrative. If desired, light source 116 may provide information regarding an ideal ambient noise sensing region by turning the illumination on or off (e.g., on when a user is making gestures that microphones 54 can detect, and off when microphones 54 cannot detect the user gestures with suitable accuracy), by providing illumination in different colors depending on whether or not microphones 54 can detect the user gestures (e.g., a continuous scale from red, indicating that microphones 54 cannot detect the user gestures, to green, indicating that microphones 54 can detect the user gestures), by switching between flashing or solid illumination depending on whether a user is providing gestures within the ideal ambient noise sensing region, or any other suitable illumination pattern or scheme.

Figure 17:
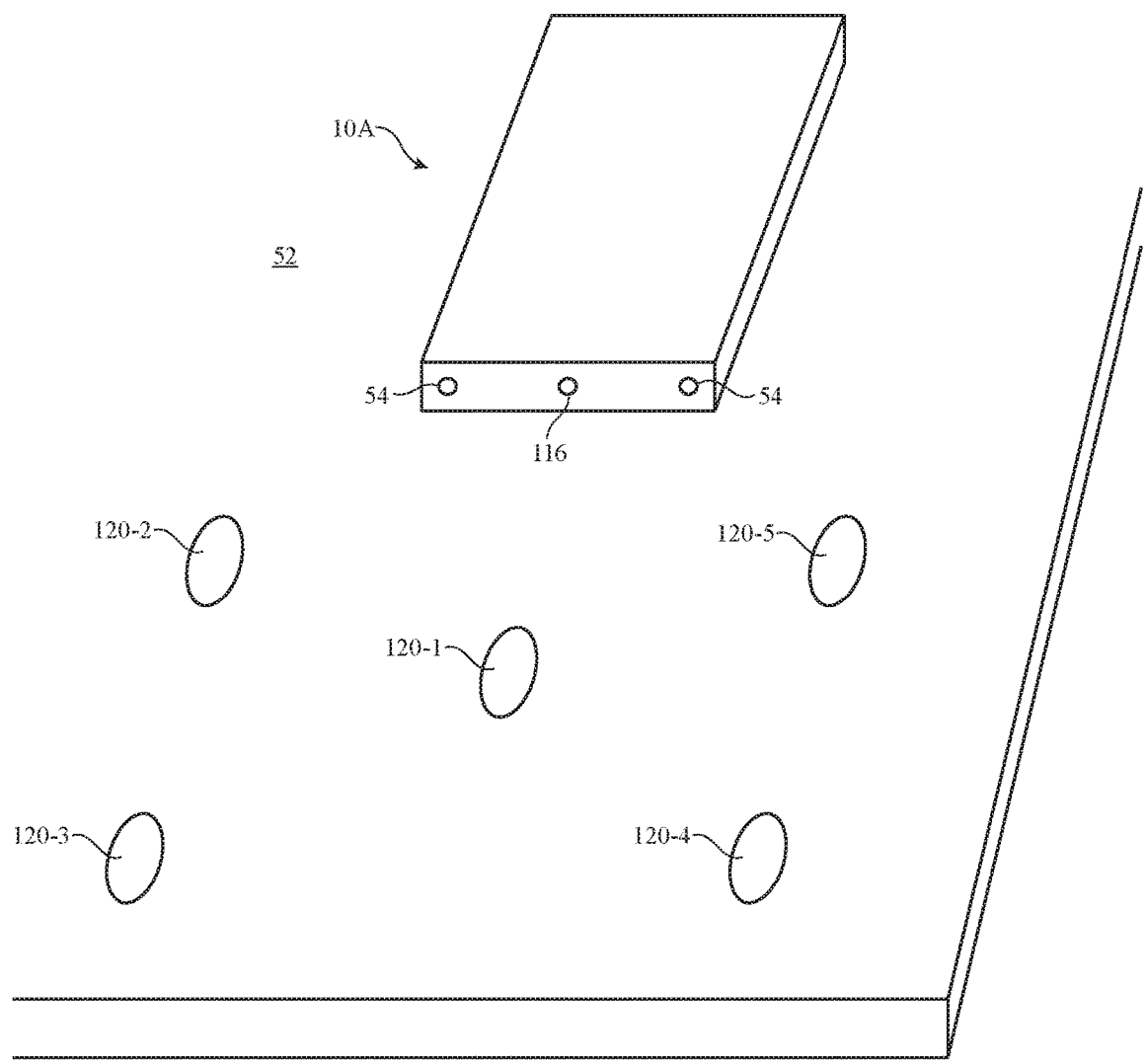
FIG. 17 is a perspective view of an electronic device having an indicator that provides guidance to a user during ambient noise sensing calibration operations in accordance with an embodiment.

An ideal ambient noise sensing region in which changes in ambient noise are best detected by microphones 54 may be a predetermined region that is programmed into device 10A, or may be determined using calibration operations as shown in FIG. 17. Calibration operations for determining an ideal ambient noise sensing region may include using microphones 54 to detect changes in ambient noise as a user makes gestures in various locations around device 10A. In one illustrative example, electronic device 10A may direct a user to make a gesture at various locations around device 10A using visual indicators 120 (sometimes referred to herein as guide spots, calibration guides, or calibration locations). An example of calibration operations of this type are shown in FIG. 17. In this example, light source 116 generates a plurality of visual indicators 120 that indicate locations at which a user should make a gesture so that microphones 54 can detect associated changes in ambient noise.

As shown in FIG. 17, light source 116 may generate visual indicators such as visual indicators 120-1, 120-2, 120-3, 120-4, and 120-5. When visual indicator 120-1 is projected onto surface 52, a user may perform a gesture at the location on surface 52 illuminated by indicator 120-1. The gesture may include a tap, a touch, moving a finger or hand closer to or farther away from surface 52, swiping a hand or finger over indicator 120-1, or any other suitable gesture. Microphones 54 may detect the change in ambient noise that occurs as the gesture is performed, and may associate the detected change in ambient noise with performing the given gesture at the given location. A user may then proceed to make specific gestures at each of the locations on surface 52 illuminated by indicators 120-2, 120-3, 120-4, and 120-5. At each location, microphones 54 may detect the changes in ambient noise and associate the changes with the given gesture being performed at the specific area illuminated by the indicator. If desired, one or more of indicators 120-1, 120-2, 120-3, 120-4, and 120-5 may be illuminated simultaneously. In another example, only one of the indicators 120 may be illuminated at any given time, such that a user receives clear instructions to perform a gesture at a given location.

The calibration operations may involve providing instructions to a user using indicators other than visual indicators 120. For example, device 10A may provide auditory guidance to a user regarding what gesture should be performed, when the gesture should be performed, whether or not the gesture and/or associated ambient noise change were detected by microphone 54, or other suitable directions for calibrating device 10A for ambient noise detection. Device 10A may also provide guidance during calibration operations using additional visual indicators on display 14. For example, display 14 may provide written or otherwise visual instructions to a user during calibration operations. The information provided by visual instructions on display 14 may be similar to or different that the instructions described above that may be provided using auditory cues. In one illustrative example, guidance provided by device 10A during calibration operations may include instructing a user to make a gesture closer to or farther away from device 10A.

If desired, calibration operations may not require the use of indicators 120. For example, calibration operations may begin at the request of a user, or may be initiated automatically. In one example, the calibration operation may include a test gesture made by a user. The device 10A may instruct the user on when and where to make the gesture, as well as to what gesture should be made (for example, by providing visual instructions on display 14, or by providing auditory cues using a speaker 33 on device 10A). Based on changes in ambient noise detected by microphones 54 in response to the test gesture, device 10A may determine whether or not the environment is suitable for ambient noise sensing. Based on the ambient noise changes detected by microphone 54, device 10A may provide user guidance to enhance ambient noise sensing. User guidance may include instructing a user to change the location, intensity, or type of gesture, or to change the environment surrounding device 10A (e.g., instructing a user to move somewhere quieter). If desired, device 10A may make determinations regarding whether or not the environment surrounding device 10A is suitable for ambient noise sensing without a test gesture. For example, device 10A may sample the ambient noise profile around device 10A prior to any user gestures, and determine whether or not the ambient noise profile is suitable for ambient noise sensing. Based on the detected ambient noise, device 10A may provide feedback to a user to enhance ambient noise sensing at device 10A (e.g., instructing a user to move to a quieter or noisier location, instructing a user to make a gesture closer or farther away from the device 10A, instructing a user to make a different type of gesture, etc.). If desired, an indication of whether or not an environment is suitable for ambient noise sensing may be provided by a visual indicator (e.g., light source 116) in device 10A. The visual indication may be a visual signal such as a light source that changes from red to green in response to a determination that the environment surrounding device 10A is appropriate for ambient noise sensing.

In another illustrative example, calibration operations may allow a user to define an ambient noise sensing region. After calibration operations have been initiated (by a user, for example), the user may outline a desired area for the ideal ambient noise sensing region. The outline may be provided by a user touching each corner of the desired region, outlining the region by tracing an outline of the region on surface 52 with their finger, or by touching the location that is desired for the center of the region while electronic device 10A determines the area surrounding the center in which ambient noise changes can be suitably detected by microphones 54. In such an example, electronic device 10A may associate ambient noise changes with gestures at given locations around device 10A, and may use these associations to determine the outline defined by the user. This, however, is merely illustrative. In general, device 10A may determine the outline of the desired ambient noise sensing region defined by the user using any suitable detection means, such as light-based detection, proximity detection, or capacitive sensing.

During ambient noise sensing calibration operations, the locations of indicators 120 may change based on whether or not microphones 54 can detect changes in ambient noise caused by gestures at each of the locations illuminated by indicators 120. For example, a first set of indicators 120 may be displayed at the start of the calibration operations. If a user performs a desired gesture (e.g., a touch) at location 120-3, device 10A may determine if microphones 54 were able to detect changes in ambient noise associated with the gesture. If device 10A determines that microphones 54 were not able to detect the change in ambient noise with suitable accuracy, intensity, resolution, or volume, then the location of indicator 120-3 may change to a location at which microphones 54 may be able to better detect the change in ambient noise. Similar operations may be performed for each other location indicated by illumination 120. In this way, the calibration operations may include real time determination of the boundaries of the ideal ambient noise sensing region in which microphones 54 can best detect changes in ambient noise. After the ideal ambient noise sensing region is determined, light source 116 may project ambient noise sensing region indicator 118 onto surface 52 to illuminate the ideal ambient noise sensing region for a user.

Electronic device 10A may take actions other than or in addition to adjusting indicators 120 based on the detected changes in ambient noise. In one example, electronic device 10A may activate or deactivate a speaker 33 in response to the detected ambient noise. For example, if electronic device 10A determines that microphones 54 cannot sufficiently detect changes in ambient noise (e.g., the background ambient noise profile is too quiet, too loud, includes too much variation, etc.), electronic device 10A may begin generating a tone using tone generator 33 to supplement the existing ambient noise profile. In this way, electronic device 10A can change the ambient noise surrounding the device to ensure that changes in ambient noise (caused by user gestures, for example) can be detected.

In one suitable arrangement, electronic device 10A may detect and store the baseline ambient noise profile in the environment surrounding the device. As the environmental baseline ambient noise profile changes, electronic device 10A may activate tone generator 33 to generate supplemental noise such that the noise detected at microphone 54 (i.e., the combination of the noise profile from the surrounding environment and the noise generated by tone generator 33) is the same as the originally-detected baseline ambient noise profile. The repeated detection of the noise profile at microphone 54 and adjustment of the sounds generated by speaker 33 may occur as part of an iterative feedback or self-assessment loop in device 10A. In this way, ambient noise sensing may continue in changing environments without having to perform continuous calibration operations.

If desired, ambient noise-based user gestures may be used to interact with a user interface on an electronic device such as device 10A. For example, a set of user gestures may be used in a gaming application, with each user gesture in the set corresponding to an action that a user may take in the game. The electronic device may respond accordingly based on the user gesture. The electronic device may display a visual application on display screen 14, may provide audible cues through a speaker 33, may provide haptic feedback, or other suitable content while the gaming application is in use.

In a blackjack game scenario, display 14 may display a user's hand of cards and provide audio cues to alert a player of when their turn to play has come. A user may tap twice on a surface on which device 10A rests to indicate that they wish to be dealt another card, may swipe to the left or right to indicate that they do not wish to be dealt another card, may perform a combination of a swipe and a tap to indicate that they wish to split the cards in their hand, or may tap three times to indicate that the game should continue on to another player (e.g., a human or computer player). When multiple human players are participating in the game, each player may have their own device 10 that is in communication with the other devices 10, or one device may be passed between players, with each player performing a gesture to indicate that their cards should be displayed on display 14 (e.g., a swipe gesture over the display 14).

In a racing game scenario, the device 10A may rest on a table or other surface, while a user moves their hands along a latitudinal axis parallel to length dimension of the electronic device to steer a car presented to the user on the display 14. To control the speed of the car, a user may move their hands closer or farther away from the electronic device along a latitudinal axis that is parallel to a width dimension of the electronic device.

The foregoing is merely illustrative and various modifications can be made to the described embodiments. The foregoing embodiments may be implemented individually or in any combination.

What is claimed is:

1. An electronic device that operates in the presence of ambient noise, the electronic device comprising:
    a microphone that measures the ambient noise; and
    processing circuitry that, based on the measured ambient noise, identifies a user gesture that comprises movement of a user's hand relative to the electronic device without physically contacting the electronic device and without physically contacting a surface on which the electronic device rests, wherein the processing circuitry modifies the operation of the electronic device in response to the user gesture.

2. The electronic device defined in claim 1, wherein the processing circuitry determines a change in the ambient noise and identifies the user gesture based on the change in the ambient noise.

3. The electronic device defined in claim 2, wherein the processing circuitry determines the change in the ambient noise by comparing the measured ambient noise to a baseline ambient noise profile.

4. The electronic device defined in claim 2, wherein the user gesture causes the change in the ambient noise.

5. The electronic device defined in claim 2, further comprising:
    an additional microphone that measures the ambient noise, wherein the processing circuitry identifies the user gesture by comparing ambient noise measurements from the microphone and the additional microphone.

6. The electronic device defined in claim 2, further comprising:
    memory that stores a plurality of different predetermined ambient noise changes that are each associated with a different user gesture, wherein the processing circuitry identifies the user gesture by comparing the change in the ambient noise to the plurality of different predetermined ambient noise changes.

7. A method of sensing ambient noise with an electronic device that includes a microphone and processing circuitry, the method comprising:
    generating ambient noise information with the microphone;
    detecting a change in the ambient noise information using the processing circuitry;
    identifying a user gesture associated with the change in the ambient noise information using the processing circuitry, wherein the user gesture comprises movement of a user's hand relative to the electronic device without physically contacting the electronic device and without physically contacting a surface on which the electronic device rests; and
    with the processing circuitry, adjusting an operational parameter of the electronic device in response to the user gesture.

8. The method defined in claim 7, wherein determining the user gesture further comprises:
    comparing the change in the ambient noise information to a plurality of predetermined ambient noise changes stored in memory in the electronic device, wherein each of the predetermined ambient noise changes corresponds to a different user gesture.

9. The method defined in claim 7, further comprising:
    generating additional ambient noise information with an additional microphone in the electronic device; and
    determining the user gesture based on the ambient noise information and the additional ambient noise information.

10. The method defined in claim 7, wherein detecting the change in the ambient noise information comprises comparing the ambient noise information to a baseline ambient noise profile, and wherein the change in the ambient noise is at least partially caused by the user gesture.

11. The method defined in claim 7, wherein the electronic device comprises a display and the user gesture comprises a user sliding a finger on a surface, wherein adjusting the operational parameter comprises scrolling through content displayed on the display.

12. The method defined in claim 7, wherein adjusting the operational parameter comprises an action selected from group consisting of: providing an audible cue to the user through a speaker in the electronic device, performing an action in a gaming application, zooming into a display screen displayed on a display of the electronic device, zooming out of a display screen displayed on a display of the electronic device, and switching between different display screens displayed on a display of the electronic device.

13. An electronic device that gathers user input comprising:
    a microphone that detects changes in ambient noise relative to a baseline ambient noise profile;
    processing circuitry that identifies user gestures based on the detected changes in the ambient noise;
    a light source that provides visual feedback in response to identification of the user gestures by the processing circuitry; and
    a tone generator that generates a tone that supplements the baseline ambient noise profile when the processing circuitry cannot identify the user gestures.

14. The electronic device defined in claim 13, wherein the feedback comprises a visible outline projected onto a surface on which the electronic device rests.

15. The electronic device defined in claim 14, wherein the visible outline indicates an area in which the user gestures can be identified by the processing circuitry.

16. The electronic device defined in claim 15, wherein the area is determined during a calibration process in which the microphone detects the changes in the ambient noise caused by the user gestures.

17. The electronic device defined in claim 13 further comprising an output device that directs a user to move the electronic device to a different location when the processing circuitry cannot identify the user gestures.

* * * * *